(12) United States Patent
Takeuchi et al.

(10) Patent No.: US 8,394,920 B2
(45) Date of Patent: Mar. 12, 2013

(54) COMPOSITION FOR RESIN AND OPTICAL LENS OBTAINED THEREFROM

(75) Inventors: Motoharu Takeuchi, Tokyo (JP); Takashi Aoki, Tokyo (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 179 days.

(21) Appl. No.: 12/865,014

(22) PCT Filed: Feb. 2, 2009

(86) PCT No.: PCT/JP2009/051689
§ 371 (c)(1),
(2), (4) Date: Jul. 28, 2010

(87) PCT Pub. No.: WO2009/101867
PCT Pub. Date: Aug. 20, 2009

(65) Prior Publication Data
US 2010/0331515 A1    Dec. 30, 2010

(30) Foreign Application Priority Data

Feb. 13, 2008  (JP) .................................. 2008-31793

(51) Int. Cl.
*C08G 75/16* (2006.01)
*C08G 75/04* (2006.01)
*C08G 75/14* (2006.01)

(52) U.S. Cl. ........ 528/381; 528/374; 528/375; 528/377; 528/378; 528/383

(58) Field of Classification Search .................. 528/374, 528/375, 377, 378, 381, 383
See application file for complete search history.

(56) References Cited

U.S. PATENT DOCUMENTS

| 5,807,975 | A | 9/1998 | Amagai et al. |
| 5,945,504 | A | 8/1999 | Amagi et al. |
| 6,531,532 | B1 | 3/2003 | Yoshimura et al. |

| 2004/0254258 | A1 | 12/2004 | Horikoshi et al. |
| 2007/0149639 | A1 | 6/2007 | Horikoshi et al. |
| 2009/0018308 | A1 | 1/2009 | Kamura et al. |

FOREIGN PATENT DOCUMENTS

| CN | 101175792 | 5/2008 |
| EP | 1524289 | 4/2005 |
| JP | 9-71580 | 3/1997 |
| JP | 9-110979 | 4/1997 |
| JP | 9-255781 | 9/1997 |
| JP | 2001-2783 | 1/2001 |
| JP | 3491660 | 11/2003 |
| JP | 2004-137481 | 5/2004 |
| JP | 2004-197005 | 7/2004 |
| JP | 2005-325274 | 11/2005 |
| JP | 2006-348285 | 12/2006 |
| JP | 2006-348286 | 12/2006 |
| JP | 2006-348289 | 12/2006 |
| WO | 2004/005374 A1 | 1/2004 |
| WO | 2006/123731 A1 | 11/2006 |

OTHER PUBLICATIONS

China Office action that issued with respect to patent family member Chinese Patent Application No. 200980103995.1, mail date is Jan. 18, 2012.
U.S. Appl. No. 13/319,857, filed Nov. 10, 2011.
U.S. Application No. to Takeshi Hirokane et al., which was filed on Jan. 1, 1900.
Chinese Office Action for corresponding Chinese Application CN200980103995.1, pp. 1-3, the Chinese Office Action was issued Jun. 21, 2012.

*Primary Examiner* — Duc Truong
(74) *Attorney, Agent, or Firm* — Greenblum & Bernstein, P.L.C.

(57) ABSTRACT

According to a preferable embodiment of the present invention, a composition for a resin comprising an inorganic compound having a sulfur atom and/or a selenium atom, an episulfide compound, and a mercaptodisulfide compound can be provided. According to another preferable embodiment of the present invention, a composition for a resin having the viscosity thereof decreased to facilitate a cast polymerization operation and thus to improve the tonality of the obtained optical material can be provided. According to still another preferable embodiment of the present invention, an optical material obtained by curing the above-described composition for a resin and having a high refractive index can be provided.

8 Claims, No Drawings

COMPOSITION FOR RESIN AND OPTICAL LENS OBTAINED THEREFROM

TECHNICAL FIELD

The present invention relates to a composition for a resin, and also to an optical material having a high refractive index and a high Abbe number, which is obtained by use of a composition for a resin containing an organic compound having a sulfur atom and/or a selenium atom. The optical material obtained according to the present invention is usable for optical products such as plastic lenses, prisms, optical fibers, information recording substrates, filters, adhesives and the like, especially preferably for plastic lenses for eyeglasses.

BACKGROUND ART

Recently, plastic materials have been often used for various optical materials, especially for eyeglasses, because of being lightweight, highly tough and easy to be dyed. Most important properties required for optical materials, especially eyeglasses, are a high refractive index and a high Abbe number. A high refractive index allows lenses to be thinner, and a high Abbe number decreases the chromatic aberration of lenses. For the purpose of realizing a high refractive index and a high Abbe number, many polyepisulfide compounds which have a good balance of the refractive index and the Abbe number have been reported (for example, see Japanese Laid-Open Patent Publications Nos. 9-71580, 9-110979 and 9-255781). Optical materials obtained from the polyepisulfide compounds described in these patent publications have realized a high refractive index of 1.7 or greater and a high Abbe number, but a material having a still higher refractive index has been desired.

With such a background, Japanese Laid-Open Patent Publication No. 2001-2783 proposes an optical material using an inorganic compound having a sulfur atom and/or a selenium atom for the purpose of realizing a still higher refractive index. In this case, as described in Japanese Laid-Open Patent Publications Nos. 2004-197005 and 2004-137481, in order to guarantee that the obtained optical material is transparent, a preparation process of a composition of the compound needs to include a preliminary polymerization reaction and degassing. However, during the preliminary polymerization reaction and the degassing, the viscosity of the composition is increased. Especially in the case where the amount of the inorganic compound having a sulfur atom and/or a selenium atom is increased to realize a high refractive index, it is difficult to perform a usual cast polymerization operation including filtration and mold injection, and also the tonality of the obtained material is significantly deteriorated occasionally. For preventing these, Japanese Laid-Open Patent Publications Nos. 2006-348285, 2006-348286 and 2006-348289 propose adding a compound having one SH group, a compound having at least one disulfide bond, or a compound having at least one NH group and/or $NH_2$ group. However, the refractive index of the obtained optical material is about 1.76 at the highest.

Patent Document 1: Japanese Laid-Open Patent Publication No. 9-71580
Patent Document 2: Japanese Laid-Open Patent Publication No. 9-110979
Patent Document 3: Japanese Laid-Open Patent Publication No. 9-255781
Patent Document 4: Japanese Laid-Open Patent Publication No. 2001-2783
Patent Document 5: Japanese Laid-Open Patent Publication No. 2004-197005
Patent Document 6: Japanese Laid-Open Patent Publication No. 2004-137481
Patent Document 7: Japanese Laid-Open Patent Publication No. 2006-348285
Patent Document 8: Japanese Laid-Open Patent Publication No. 2006-348286
Patent Document 9: Japanese Laid-Open Patent Publication No. 2006-348289

DISCLOSURE OF THE INVENTION

Problem to be Solved by Invention

An object of the present invention is to provide a composition for a resin which is usable to create an optical material having a still higher refractive index and an improved tonality.

As a result of accumulating active studies under such circumstances, the present inventors found that a compound represented by the following formula (2) decreases the viscosity of a composition for a resin containing an inorganic compound having a sulfur atom and/or a selenium atom to facilitate a cast polymerization operation and thus achieves the above-described object.

Means to Solve the Problem

Namely, an embodiment of the present invention is directed to a composition for a resin, comprising an (a) inorganic compound having a sulfur atom and/or a selenium atom; a (b) compound represented by the following formula (1):

[Chemical formula 1]

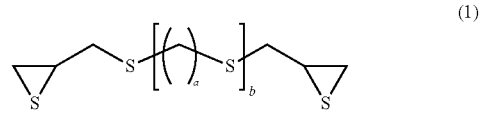

(a represents an integer of 0 to 4, and b represents an integer of 0 to 2); and a (c) compound represented by the following formula (2):

[Chemical formula 2]

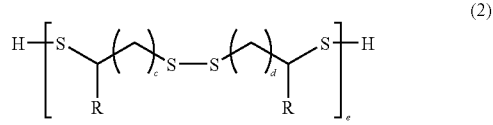

(c represents 0 or 1, d represents 0 or 1, e represents an integer of 1 to 10, and R represents H, SH, $CH_2SH$ or an aromatic ring);

wherein where the (a) compound and the (b) compound have a total amount of 100 parts by weight, the (a) compound is contained in an amount of 1 to 50 parts by weight, the (b) compound is contained in an amount of 50 to 99 parts by weight, and the (c) compound is contained in an amount of 1 to 50 parts by weight.

In a preferable embodiment of the present invention directed to the composition for a resin, the (a) compound is sulfur. In another preferable embodiment of the present invention directed to the composition for a resin, the (b) compound is bis(β-epithiopropyl)sulfide or bis(β-epithiopropyl)disulfide. In still another preferable embodiment of the present invention directed to the composition for a resin, the (c) compound is bis(mercaptomethyl)disulfide or bis(dimercaptomethyl)disulfide.

Another embodiment of the present invention is directed to a method for producing a composition for a resin, comprising the steps of:

mixing an (a) inorganic compound having a sulfur atom and/or a selenium atom and a (b) compound represented by the following formula (1):

[Chemical formula 3]

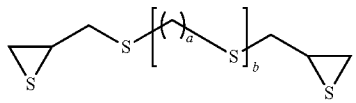

(1)

(a represents an integer of 0 to 4, and b represents an integer of 0 to 2); and performing a preliminary polymerization reaction of the obtained mixture for 1 minute to 72 hours at 0° C. to 150° C.; and mixing the preliminarily polymerized mixture and a (c) compound represented by the following formula (2):

[Chemical formula 4]

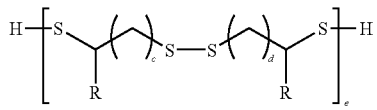

(2)

(c represents 0 or 1, d represents 0 or 1, e represents an integer of 1 to 10, and R represents H, SH, CH$_2$SH or an aromatic ring), wherein where the (a) compound and the (b) compound have a total amount of 100 parts by weight, the (a) compound is contained in an amount of 1 to 50 parts by weight, the (b) compound is contained in an amount of 50 to 99 parts by weight, and the (c) compound is contained in an amount of 1 to 50 parts by weight.

Still another embodiment of the present invention is directed to a method for producing a composition for a resin, comprising the steps of:

mixing an (a) inorganic compound having a sulfur atom and/or a selenium atom, a (b) compound represented by the following formula (1):

[Chemical formula 5]

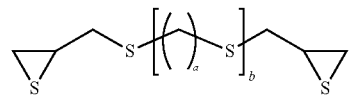

(1)

(a represents an integer of 0 to 4, and b represents an integer of 0 to 2), and a (c) compound represented by the following formula (2):

[Chemical formula 6]

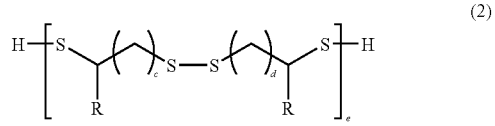

(2)

(c represents 0 or 1, d represents 0 or 1, e represents an integer of 1 to 10, and R represents H, SH, CH$_2$SH or an aromatic ring); and performing a preliminary polymerization reaction of the obtained mixture for 1 minute to 72 hours at 0° C. to 150° C.;

wherein where the (a) compound and the (b) compound have a total amount of 100 parts by weight, the (a) compound is contained in an amount of 1 to 50 parts by weight, the (b) compound is contained in an amount of 50 to 99 parts by weight, and the (c) compound is contained in an amount of 1 to 50 parts by weight.

Still another embodiment of the present invention is directed to a method for producing a composition for a resin, comprising the steps of:

mixing an (a) inorganic compound having a sulfur atom and/or a selenium atom, a (b) compound represented by the following formula (1):

[Chemical formula 7]

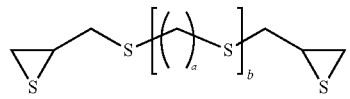

(1)

(a represents an integer of 0 to 4, and b represents an integer of 0 to 2), and a (c) compound represented by the following formula (2);

performing a preliminary polymerization reaction of the obtained mixture for 1 minute to 72 hours at 0° C. to 150° C.; and further mixing the preliminarily polymerized mixture and the (c) compound represented by the following formula (2):

[Chemical formula 8]

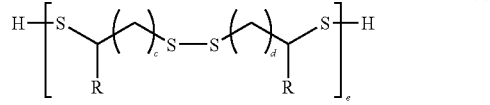

(2)

(c represents 0 or 1, d represents 0 or 1, e represents an integer of 1 to 10, and R represents H, SH, CH$_2$SH or an aromatic ring);

wherein where the (a) compound and the (b) compound have a total amount of 100 parts by weight, the (a) compound is contained in an amount of 1 to 50 parts by weight, the (b) compound is contained in an amount of 50 to 99 parts by weight, and the (c) compound is contained in an amount of 1 to 50 parts by weight.

In a preferable embodiment of the present invention directed to the method for producing a composition for a resin, the method further comprises the step of performing degassing under reduced pressure of 0.005 to 250 torr for 1 minute to 24 hours at 0° C. to 100° C.

Still another embodiment of the present invention is directed to a method for producing an optical material, comprising polymerizing and curing the composition for a resin obtained by the above-described method for producing a composition for a resin.

Still another embodiment of the present invention is directed to an optical material, comprising the above-described composition for a resin, wherein the optical material has an refractive index of 1.76 or greater.

In a preferable embodiment of the present invention directed to the optical material, the optical material has an refractive index of 1.77 or greater. In another preferable embodiment of the present invention directed to the optical material, the optical material has an Abbe number of 20 to 80. In still another preferable embodiment of the present invention directed to the optical material, the optical material has a softening point of 50 to 200° C. In still another preferable embodiment of the present invention directed to the optical material, the optical material has a tonality (YI value) of 0 to 10.

Still another embodiment of the present invention is directed to an optical lens, comprising the above-described optical material.

Still another embodiment of the present invention is directed to use of a composition for producing an optical material having a refractive index of 1.76 or greater, wherein the composition comprises an (a) inorganic compound having a sulfur atom and/or a selenium atom; a (b) compound represented by the following formula (1):

[Chemical formula 9]

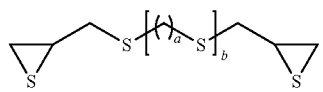

(1)

(a represents an integer of 0 to 4, and b represents an integer of 0 to 2); and a (c) compound represented by the following formula (2):

[Chemical formula 10]

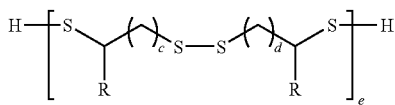

(2)

(c represents 0 or 1, d represents 0 or 1, e represents an integer of 1 to 10, and R represents H, SH, $CH_2SH$ or an aromatic ring);
wherein where the (a) compound and the (b) compound have a total amount of 100 parts by weight, the (a) compound is contained in an amount of 1 to 50 parts by weight, the (b) compound is contained in an amount of 50 to 99 parts by weight, and the (c) compound is contained in an amount of 1 to 50 parts by weight.

Still another embodiment of the present invention is directed to use of a compound usable to produce an optical lens for decreasing a viscosity of a composition for a resin preliminarily polymerized and deaerated to a range of 10 to 200 mPa·s, wherein the compound is represented by the following formula (2):

[Chemical formula 11]

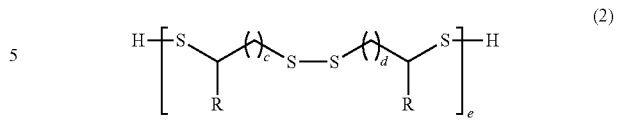

(2)

(c represents 0 or 1, d represents 0 or 1, e represents an integer of 1 to 10, and R represents H, SH, $CH_2SH$ or an aromatic ring).

The conventionally obtained optical material has a refractive index of about 1.76 at the highest, but a preferable embodiment of the present invention has a significant effect of improving the refractive index of the optical material to about 1.78. In addition, a preferable embodiment of the present invention has a splendid effect of decreasing the viscosity of a composition for a resin containing an inorganic compound having a sulfur atom and/or a selenium atom and thus facilitating a cast polymerization operation by incorporating a specific amount of a component represented by the formula (2) above.

BEST MODE FOR CARRYING OUT THE INVENTION

Hereinafter, the present invention will be described in more detail.

In the present invention, the expression "(a) inorganic compound having a sulfur atom and/or a selenium atom" encompasses all the inorganic compounds having at least one sulfur atom and/or selenium atom. Herein, the term "inorganic compound" is as described in "Hyojun Kagaku Yogo Jiten" (Dictionary of Standard Chemical Terms) (edited by The Chemical Society of Japan (1991), published by Maruzen Co., Ltd.).

Specific examples of the inorganic compound having a sulfur atom, among the (a) compound, include sulfur, hydrogen sulfide, carbon disulfide, carbon selenosulfide, ammonium sulfide; sulfur oxides such as sulfur dioxide, sulfur trioxide and the like; thiocarbonate, sulfuric acid and salts thereof, hydrogen sulfate, sulfite, hyposulfite, persulfate, thiocyanate, thiosulfate; halides such as sulfur dichloride, thionyl chloride, thiophosgene and the like; boron sulfide, nitrogen sulfide, silicon sulfide, phosphorus sulfide, arsenic sulfide, metal sulfides, metal hydrosulfides; and the like. Among these, sulfur, carbon disulfide, phosphorus sulfide, selenium sulfide, metal sulfides, and metal hydrosulfides are preferable. Sulfur, carbon disulfide, and selenium sulfide are more preferable. Sulfur is especially preferable.

Specific examples of the inorganic compound having a selenium atom include selenium, hydrogen selenide, carbon diselenide, ammonium selenide; selenium oxides such as selenium dioxide and the like; selenic acid and salts thereof, selenious acid and salts thereof, hydrogen selenide, selenosulfuric acid and salts thereof, selenopyrosulfuric acid and salts thereof; halides such as selenium tetrabromide, selenium oxychloride and the like; selenocyanate, boron selenide, phosphorus selenide, arsenic selenide, metal selenides; and the like. Among these, selenium, carbon diselenide, phosphorus selenide, and metal selenides are more preferable. Selenium and carbon diselenide are especially preferable. These inorganic compounds having a sulfur atom and inorganic compounds having a selenium atom may be used independently or as a mixture of two or more. The (b) compound is represented by the following formula (1).

[Chemical formula 12]

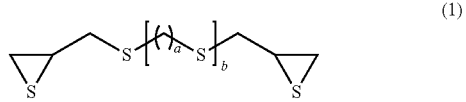

(1)

In the formula, "a" represents an integer of 0 to 4, and preferably 0 to 2. "b" represents an integer of 0 to 2, and preferably 0 to 1.

Specific examples of the (b) compound include episulfides such as bis(β-epithiopropyl)sulfide, bis(β-epithiopropyl)disulfide, bis(β-epithiopropyl)trisulfide, bis(β-epithiopropylthio)methane, 1,2-bis(β-epithiopropylthio)ethane, 1,3-bis(β-epithiopropylthio)propane, 1,2-bis(β-epithiopropylthio)propane, 1,4-bis(β-epithiopropylthio)butane, bis(β-epithiopropylthioethyl)sulfide, and the like. The (b) compounds may be used independently or as a mixture of two or more. Among these, bis(β-epithiopropyl)sulfide and bis(β-epithiopropyl)disulfide are preferable. Bis(β-epithiopropyl)sulfide is most preferable.

Methods for producing the compounds represented by the formula (1) above include known methods described in E. P. Adams et al., J. Chem. Soc., page 2665 (1960), Japanese Patent No. 3491660 and the like.

The mixing ratio of the (a) compound is preferably 30% by weight or higher with respect to the composition for a resin. When this ratio is less than 30% by weight, the obtained optical material does not achieve a high refractive index. Where the (a) compound and the (b) compound have a total amount of 100 parts by weight, the (a) compound is contained in an amount of 1 to 50 parts by weight, preferably 5 to 50 parts by weight, more preferably 10 to 45 parts by weight, especially preferably 15 to 40 parts by weight, and most preferably 20 to 35 parts by weight. The target refractive index of the optical material is preferably 1.72 or greater, more preferably 1.74 or greater, further preferably 1.76 or greater, especially preferably 1.77 or greater, and most preferably 1.78 or greater. As the refractive index is higher, the effect of the present invention is more conspicuous.

Where the (a) compound and the (b) compound have a total amount of 100 parts by weight, the (b) compound is contained in an amount of 50 to 99 parts by weight, preferably 50 to 95 parts by weight, more preferably 60 to 90 parts by weight, especially preferably 65 to 85 parts by weight, and most preferably 70 to 80 parts by weight.

The (c) compound is represented by the following formula (2).

[Chemical formula 13]

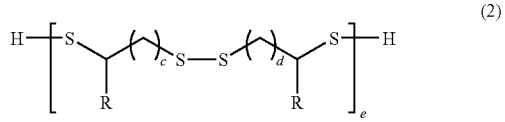

(2)

In the formula, "c" represents 0 or 1, "d" represents 0 or 1, "e" represents an integer of 1 to 10, and "R" represents H, SH, $CH_2SH$ or an aromatic ring. Examples of the aromatic ring include benzene, thiophene, naphthalene, derivatives thereof, and the like.

Especially, c and d are preferably 0. e is preferably an integer of 1 to 5, more preferably 1 or 2, and especially preferably 1. R is preferably H, SH or $CH_2CH$, and more preferably H.

Specific examples of the (c) compound include bis(mercaptomethyl)disulfide, bis(dimercaptomethyl)disulfide, bis(1,2-dimercaptoethyl)disulfide, bis(2-mercapto-2-phenylmethyl)disulfide, bis(mercaptoethyl)disulfide, bis(2,2-dimercaptoethyl)disulfide, bis(2,3-dimercaptopropyl)disulfide, bis(2-mercapto-2-phenylethyl)disulfide, (mercaptomethyl)(mercaptoethyl)disulfide, (dimercaptomethyl)(dimercaptoethyl)disulfide, and the like. Among these, bis(mercaptomethyl)disulfide and bis(dimercaptomethyl)disulfide are preferable. Bis(mercaptomethyl)disulfide is most preferable. The (c) compounds may be used independently or as a mixture of two or more.

As a result of active studies for decreasing the viscosity of a composition for a resin containing the (a) compound and the (b) compound and for obtaining an optical material having a good tonality from the composition, the present inventors found that a composition for a resin containing a specific amount of the (c) compound represented by the formula (2) above is effective. By contrast, with the compound having at least two SH groups recommended in Japanese Laid-Open Patent Publication No. 2004-137481 and the like, a composition for a resin having a low viscosity is not obtained occasionally. With the compound having one SH group, the compound having at least one disulfide bond or the compound having at least one NH group and/or $NH_2$ group, which are recommended in Japanese Laid-Open Patent Publications Nos. 2006-348285, 2006-348286, 2006-348289 and the like, a composition for a resin having a low viscosity is occasionally obtained, but there is a problem that the tonality of an optical material obtained as a result of polymerizing and curing is significantly deteriorated. The above-listed conventionally known documents do not describe at all the splendid inventive concept that by incorporating a specific amount of a compound represented by the formula (2) above, the viscosity of a composition for a resin containing an inorganic compound having a sulfur atom and/or a selenium atom is decreased to facilitate the cast polymerization operation. In addition, the refractive index of the optical material conventionally obtained is about 1.76 at the highest, but a preferable embodiment of the present invention improves the refractive index of the obtained optical material to an amazing level of about 1.78.

For producing the (c) compound represented by the formula (2) above, many known methods for synthesizing a disulfide compound are applicable. Among those, a production method using an oxidation reaction of mercaptan represented by the following formula (3), which is generally known by "Jikken Kagaku Koza 17—Yuki Kagobutsu no Gosei I" (Experimental Science Course 17—Synthesis of Organic Compounds I), Book 1, page 214 (1957) edited by The Chemical Society of Japan and published by Maruzen Co., Ltd. is easy and simple.

[Chemical formula 14]

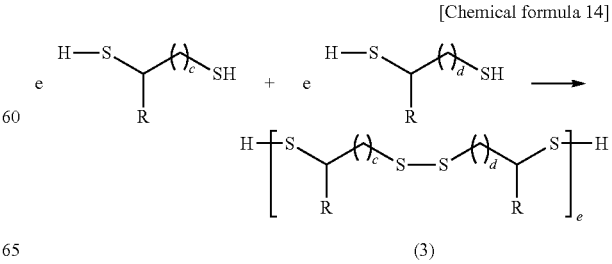

(3)

In the formula, "c" represents 0 or 1, "d" represents 0 or 1, "e" represents an integer of 1 to 10, and "R" represents H, SH, CH₂SH or an aromatic ring.

Where the (a) compound and the (b) compound have a total amount of 100 parts by weight, the (c) compound is contained in an amount of 1 to 50 parts by weight, preferably 2 to 40 parts by weight, more preferably 3 to 30 parts by weight, especially preferably 4 to 25 parts by weight, and most preferably 5 to 20 parts by weight.

There is no specific limitation on the viscosity of the composition for a resin having a low viscosity, which is an object of the present invention, as long as the cast polymerization operation is performed in a proper manner. The viscosity is preferably 300 mPa·s or less, more preferably 200 mPa·s or less, and especially preferably 140 mPa·s or less. The lower limit of the viscosity is usually about 100 mPa·s. In general, general, when the viscosity of the composition for a resin is 200 mPa·s or less, it is possible to perform the cast polymerization operation. When the viscosity thereof exceeds 300 mPa·s, it is difficult to perform the cast polymerization operation (filtration: generally using a filter having a pore diameter of 0.01 to 10 μm). When the viscosity thereof exceeds 500 mPa·s, it is impossible to perform the cast polymerization operation (filtration). Herein, the "viscosity" can be measured by the method described in the "Examples" section below.

There is no specific limitation on the tonality of the optical material, which is an object of the present invention, as long as the optical material is colorless and transparent in an external appearance thereof. The optical material has a YI value (an index representing the degree of yellowness; thickness: 2.5 mm) of preferably 10 or less, and more preferably 5 or less. The lower limit of the YI value is usually about 0. In general, when the YI value is 5 or less, it is easy to make the external appearance colorless and transparent by adding a bluing agent or the like, but when the YI value exceeds 20, it is difficult to make the external appearance colorless and transparent. Herein, the "YI value" can be measured by the method described in the "Examples" section below.

The optical material obtained using a composition for a resin according to the present invention has a softening point of preferably 50 to 200° C., and more preferably 70 to 200° C. The softening point is an index representing the heat resistance. A softening point of 50° C. or higher is preferable because with such a softening point, the obtained lens is not much deformed by post processing such as coating or dyeing, which is accompanied by heating. Herein, the "softening point" can be measured by the method described in the "Examples" section below.

The optical material obtained using a composition for a resin according to the present invention has an Abbe number of preferably 20 to 80, and more preferably 30 to 70. An Abbe number of 20 or greater is preferable because with such an Abbe number, the color of an image is not much blurred and the image is easy to see. Herein, the "Abbe number" can be measured by the method described in the "Examples" section below.

When polymerizing and thus curing a composition for a resin according to the present invention, a (d) polymerization catalyst can be added when necessary. Usable polymerization catalysts include amines, phosphines, quaternary ammonium salts, quaternary phosphonium salts, condensates of aldehyde and amine-based compound, salts of carboxylic acid and ammonia, urethanes, thiourethanes, guanidines, thioureas, thiazoles, sulfeneamides, thiurams, dithiocarbamates, xanthogenates, tertiary sulfonium salts, secondary iodonium salts, mineral acids, Lewis acids, organic acids, silicic acids, tetrafluoroborates, peroxides, azo-based compounds, and acidic phosphoric acid esters. Representative specific examples of the (d) compound will be listed below.

(1) Amine-based compounds represented by, for example, primary amines such as ethylamine, n-propylamine, sec-propylamine, n-butylamine, sec-butylamine, i-butylamine, tert-butylamine, pentylamine, hexylamine, heptylamine, octylamine, decylamine, laurylamine, myristylamine, 1,2-dimethylhexylamine, 3-pentylamine, 2-ethylhexylamine, allylamine, aminoethanol, 1-aminopropanol, 2-aminopropanol, aminobutanol, aminopentanol, aminohexanol, 3-ethoxypropylamine, 3-propoxypropylamine, 3-isopropoxypropylamine, 3-butoxypropylamine, 3-isobutoxypropylamine, 3-(2-ethylhexyloxy)propylamine, aminocyclopentane, aminocyclohexane, aminonorbornene, aminomethylcyclohexane, aminobenzene, benzylamine, phenetylamine, α-phenylethylamine, naphtylamine, furfurylamine, and the like; primary polyamines such as ethylenediamine, 1,2-diaminopropane, 1,3-diaminopropane, 1,2-diaminobutane, 1,3-diaminobutane, 1,4-diaminobutane, 1,5-diaminopentane, 1,6-diaminohexane, 1,7-diaminoheptane, 1,8-diaminooctane, dimethylaminopropylamine, diethylaminopropylamine, bis-(3-aminopropyl)ether, 1,2-bis-(3-aminopropoxy)ethane, 1,3-bis-(3-aminopropoxy)-2,2'-dimethylpropane, aminoethylethanolamine, 1,2-, 1,3- or 1,4-bisaminocyclohexane, 1,3- or 1,4-bisaminomethylcyclohexane, 1,3- or 1,4-bisaminoethylcyclohexane, 1,3- or 1,4-bisaminopropylcyclohexane, hydrogenated 4,4'-diaminodiphenylmethane, 2- or 4-aminopiperidine, 2- or 4-aminomethylpiperidine, 2- or 4-aminoethylpiperidine, N-aminoethylpiperidine, N-aminopropylpiperidine, N-aminoethylmorpholine, N-aminopropylmorpholine, isophoronediamine, menthanediamine, 1,4-bisaminopropylpiperazine, o-, m-, or p-phenylenediamine, 2,4- or 2,6-tolylenediamine, 2,4-toluenediamine, m-aminobenzylamine, 4-chloro-o-phenylenediamine, tetrachloro-p-xylylenediamine, 4-methoxy-6-methyl-m-phenylenediamine, m- or p-xylylenediamine, 1,5- or 2,6-naphthalenediamine, benzidine, 4,4'-bis(o-toluidine), dianisidine, 4,4'-diaminodiphenylmethane, 2,2-(4,4'-diaminodiphenyl)propane, 4,4'-diaminodiphenylether, 4,4'-thiodianiline, 4,4'-diaminodiphenylsulfone, 4,4'-diaminoditolylsulfone, methylenebis(o-chloroaniline), 3,9-bis(3-aminopropyl)-2,4,8,10-tetraoxaspiro[5,5]undecane, diethylenetriamine, iminobispropylamine, methyliminobispropylamine, bis(hexamethylene)triamine, triethylenetetramine, tetraethylenepentamine, pentaethylenehexamine, N-aminoethylpiperazine, N-aminopropylpiperazine, 1,4-bis(aminoethylpiperazine), 1,4-bis(aminopropylpiperazine), 2,6-diaminopyridine, bis(3,4-diaminophenyl)sulfone, and the like; secondary amines such as diethylamine, dipropylamine, di-n-butylamine, di-sec-butylamine, diisobutylamine, di-n-pentylamine, di-3-pentylamine, dihexylamine, octylamine, di(2-ethylhexyl)amine, methylhexylamine, diallylamine, pyrrolidine, piperidine, 2-, 3-, 4-picoline, 2,4-, 2,6-, 3,5-lupetidine, diphenylamine, N-methylaniline, N-ethylaniline, dibenzylamine, methylbenzylamine, dinaphtylamine, pyrrole, indoline, indole, morpholine, and the like; secondary polyamines such as N,N'-dimethylethylenediamine, N,N'-dimethyl-1,2-diaminopropane, N,N'-dimethyl-1,3-diaminopropane, N,N-dimethyl-1,2-diaminobutane, N,N-dimethyl-1,3-diaminobutane, N,N'-dimethyl-1,4-diaminobutane, N,N'-dimethyl-1,5-diaminopentane, N,N-dimethyl-1,6-diaminohexane, N,N'-dimethyl-1,7-diaminoheptane, N,N'-diethylethylenediamine, N,N'-diethyl-1,2-diaminopropane, N,N'-diethyl-1,3-diaminopropane, N,N'-diethyl-1,2-diaminobutane, N,N'-diethyl-1,3-diaminobutane, N,N'-diethyl-1, 4-diaminobutane, N,N'-diethyl-1,6-diaminohexane, piperazine, 2-methylpiperazine, 2,5- or 2,6-dimethylpiperazine, homopiperazine, 1,1-di-(4-piperidyl)methane, 1,2-di-(4-piperidyl)ethane, 1,3-di-(4-piperidyl)propane, 1,4-di-(4-piperidyl)butane, tetramethylguanidine, and the like; tertiary amines such as trimethylamine, triethylamine, tri-n-propylamine, tri-iso-propylamine, tri-1,2-dimethylpropylamine, tri-3-methoxypropylamine, tri-n-butylamine, tri-iso-butylamine, tri-sec-butylamine, tri-pentylamine, tri-3-pentylamine, tri-n-hexylamine, tri-n-octylamine, tri-2-ethylhexylamine, tri-dodecylamine, tri-laurylamine, dicyclohexylethylamine, cyclohexyldiethylamine, tri-cyclohexylamine, N,N-dimethylhexylamine, N-methyldihexylamine, N,N-dimethylcyclohexylamine, N-methyldicyclohexylamine, N,N-diethylethanolamine, N,N-dimethylethanolamine, N-ethyldiethanolamine, triethanolamine, tribenzylamine, N,N-dimethylbenzylamine, diethylbenzylamine, triphenylamine, N,N-dimethylamino-p-cresol, N,N-dimethylaminomethylphenol, 2-(N,N-dimethylaminomethyl)phenol, N,N-dimethylaniline, N,N-diethylaniline, pyridine, quinoline, N-methylmorpholine, N-methylpiperidine, 2-(2-dimethylaminoethoxy)-4-methyl-1,3,2-dioxabornane, and the like; tertiary polyamines such as tetramethylethylenediamine, pyrazine, N,N'-dimethylpiperazine, N,N'-bis((2-hydroxy)propyl)piperazine, hexamethylenetetramine, N,N,N',N'-tetramethyl-1,3-butaneamine, 2-dimethylamino-2-hydroxypropane, diethyl amino ethanol, N,N,N-tris(3-dimethylaminopropyl)amine, 2,4,6-tris(N,N-dimethylaminomethyl)phenol, heptamethylisobiguanido, and the like; imidazoles such as imidazole, N-methylimidazole, 2-methylimidazole, 4-methylimidazole, N-ethylimidazole, 2-ethylimidazole, 4-ethylimidazole, N-butylimidazole, 2-butylimidazole, N-undecylimidazole, 2-undecylimidazole, N-phenylimidazole, 2-phenylimidazole, N-benzylimidazole, 2-benzylimidazole, 1-benzyl-2-methylimidazole, N-(2'-cyanoethyl)-2-methylimidazole, N-(2'-cyanoethyl)-2-undecylimidazole, N-(2'-cyanoethyl)-2-phenylimidazole, 3,3-bis-(2-ethyl-4-methylimidazolyl)methane, 2-mercaptoimidazole, 2-mercapto-1-methylimidazole, 2-mercaptobenzoimidazole, 3-mercapto-4-methyl-4H-1,2,4-triazole, 5-mercapto-1-methyl-tetrazole, 2,5-dimercapto-1,3,4-thiadiazole, adduct of alkylimidazole and isocyanuric acid, condensate of alkylimidazole and formaldehyde, and the like; pyrazoles such as 3,5-dimethylpyrazole, 3,5-di(2-pyridyl) pyrazole, 3,5-dimethyl-1-hydroxymethylpyrazole, 3,5-diisopropylpyrazole, 3,5-dimethyl-1-phenylpyrazole, 3-methylpyrazole, 4-methylpyrazole, N-methylpyrazole, 5-(thienyl) pyrazole, and the like; and amidines such as 1,8-diazabicyclo(5,4,0)undecene-7,1,5-diazabicyclo(4,3,0)nonene-5,6-dibutylamino-1,8-diazabicyclo(5,4,0)undecene-7, and the like.

(2) Phosphines such as trimethylphosphine, triethylphosphine, tri-iso-propylphosphine, tri-n-butylphosphine, tri-n-hexylphosphine, tri-n-octylphosphine, tricyclohexylphosphine, triphenylphosphine, tribenzylphosphine, tris(2-methylphenyl)phosphine, tris(3-methylphenyl)phosphine, tris(4-methylphenyl)phosphine, tris(diethylamino)phosphine, tris(4-methylphenyl)phosphine, dimethylphenylphosphine, diethylphenylphosphine, dicyclohexylphenylphosphine, ethyldiphenylphosphine, diphenylcyclohexylphosphine, chlorodiphenylphosphine, and the like.

(3) Quaternary ammonium salts such as tetramethylammonium chloride, tetramethylammonium bromide, tetramethylammonium acetate, tetraethylammonium chloride, tetraethylammonium bromide, tetraethylammonium acetate, tetra-n-butylammonium fluoride, tetra-n-butylammonium chloride, tetra-n-butylammonium bromide, tetra-n-butylammonium iodide, tetra-n-butylammonium acetate, tetra-n-butylammonium borohydride, tetra-n-butylammonium hexafluorophosphite, tetra-n-butylammonium hydrogen sulfite, tetra-n-butylammonium tetrafluoroborate, tetra-n-butylammonium tetraphenylborate, tetra-n-butylammonium paratoluenesulfonate, tetra-n-hexylammonium chloride, tetra-n-hexylammonium bromide, tetra-n-hexylammonium acetate, tetra-n-octylammonium chloride, tetra-n-octylammonium bromide, tetra-n-octylammonium acetate, trimethyl-n-octylammonium chloride, trimethyldecylammonium chloride, trimethyldodecylammonium chloride, trimethylcetylammonium chloride, trimethyllaurylammonium chloride, trimethylbenzylammonium chloride, trimethylbenzylammonium bromide, triethyl-n-octylammonium chloride, triethylbenzylammonium chloride, triethylbenzylammonium bromide, tri-n-butyl-n-octylammonium chloride, tri-n-butylbenzylammonium fluoride, tri-n-butylbenzylammonium chloride, tri-n-butylbenzylammonium bromide, tri-n-butylbenzylammonium iodide, n-butyldimethylbenzylammonium chloride, n-octyldimethylbenzylammonium chloride, decyldimethylbenzylammonium chloride, dodecyldimethylbenzylammonium chloride, cetyldimethylbenzylammonium chloride, lauryldimethylbenzylammonium chloride, methyltriphenylammonium chloride, methyltribenzylammonium chloride, methyltriphenylammonium bromide, methyltribenzylammonium bromide, ethyltriphenylammonium chloride, ethyltribenzylammonium chloride, ethyltriphenylammonium bromide, ethyltribenzylammonium bromide, n-butyltriphenylammonium chloride, n-butyltribenzylammonium chloride, n-butyltriphenylammonium bromide, n-butyltribenzylammonium bromide, 1-methylpyridinium chloride, 1-methylpyridinium bromide, 1-ethylpyridinium chloride, 1-ethylpyridinium bromide, 1-n-butylpyridinium chloride, 1-n-butylpyridinium bromide, 1-n-hexylpyridinium chloride, 1-n-hexylpyridinium bromide, 1-n-octylpyridinium bromide, 1-n-dodecylpyridinium chloride, 1-n-dodecylpyridinium bromide, 1-n-cetylpyridinium chloride, 1-n-cetylpyridinium bromide, 1-phenylpyridinium chloride, 1-phenylpyridinium bromide, 1-benzylpyridinium chloride, 1-benzylpyridinium bromide, 1-methylpicolinium chloride, 1-methylpicolinium bromide, 1-ethylpicolinium chloride, 1-ethylpicolinium bromide, 1-n-butylpicolinium chloride, 1-n-butylpicolinium bromide, 1-n-hexylpicolinium chloride, 1-n-hexylpicolinium bromide, 1-n-octylpicolinium chloride, 1-n-octylpicolinium bromide, 1-n-dodecylpicolinium chloride, 1-n-dodecylpicolinium bromide, 1-n-cetylpicolinium chloride, 1-n-cetylpicolinium bromide, 1-phenylpicolinium chloride, 1-phenylpicolinium bromide, 1-benzylpicolinium chloride, 1-benzylpicolinium bromide, and the like.

(4) Quaternary phosphonium salts such as tetramethylphosphonium chloride, tetramethylphosphonium bromide, tetraethylphosphonium chloride, tetraethylphosphonium bromide, tetra-n-butylphosphonium chloride, tetra-n-butylphosphonium bromide, tetra-n-butylphosphonium iodide, tetra-n-hexylphosphonium bromide, tetra-n-octylphosphonium bromide, methyltriphenyiphosphonium bromide, methyltriphenylphosphonium iodide, ethyltriphenyiphosphonium bromide, ethyltriphenylphosphonium iodide, n-butyltriphenylphosphonium bromide, n-butyltriphenylphosphonium iodide, n-hexyltriphenylphosphonium bromide, n-octyltriphenylphosphonium bromide, tetraphenylphosphonium bromide, tetrakishydroxymethylphosphonium chloride, tetrakishydroxymethylphosphonium bromide, tetrakishydroxyethylphosphonium chloride, tetrakishydroxybutyiphosphonium chloride, and the like.

(5) Condensates of aldehyde and amine-based compound such as reaction product of acetoaldehyde and ammonia, condensate of formaldehyde and paraylidyne, condensate of acetoaldehyde and paraylidyne, reaction product of formaldehyde and aniline, reaction product of acetoaldehyde and aniline, reaction product of butylaldehyde and aniline, reaction product of formaldehyde and acetoaldehyde and aniline, reaction product of acetoaldehyde and butylaldehyde and aniline, condensate of butylaldehyde and monobutylamine, reaction product of butylaldehyde and butylideneaniline, reaction product of heptoaldehyde and aniline, reaction product of trichlotonylidene and tetramine, condensate of α-ethyl-β-propylacrolein and aniline, condensate of formaldehyde and alkylimidazole, and the like.

(6) Salts of carboxylic acid and ammonia such as ammonium acetate, ammonium benzoate, ammonium carbamate, ammonium trifluoroacetate, and the like.

(7) Urethanes obtained by a reaction of alcohol and isocyanate.

(8) Thiourethanes obtained by a reaction of mercaptan and isocyanate.

(9) Guanidines such as diphenylguanidine, phenyltolylguanidine, phenylxylylguanidine, tolylxylylguanidine, diorthotolylguanidine, orthotolylguanido, diphenylguanidinephthalate, tetramethylguanidine, guanidinethiocyanate, triphenylguanidine, aminoguanidinesulfate, 1,3-diphenylguanidinesulfate, diorthotolylguanidine salt of dicatecholboric acid, and the like.

(10) Thioureas such as thiocarboalinide, diorthotolylthiourea, ethylenethiourea, diethylthiourea, dibutylthiourea, dilaurylthiourea, trimethylthiourea, dimethylethylthiourea, tetramethylthiourea, 1,3-diphenyl-2-thiourea, 1-allyl-2-thiourea, guanylthiourea, and the like.

(11) Thiazoles such as 2-mercaptobenzothiazole, dibenzothiazyldisulfide, cyclohexylamine salt of 2-mercaptobenzothiazole, 2-(2,4-dinitrophenylthio)benzothiazole, 2-(morpholinodithio)benzothiazole, 2-(2,6-dimethyl-4-morpholinothio)benzothiazole, N,N-diethylthiocarbamoyl-2-benzothiazolylsulfide, 1,3-bis(2-benzothiazolylmercaptomethyl)urea, benzothiadiazylthiobenzoate, 2-mercaptothiazoline, 2-mercapto-5-methyl-1,3,4-thiadiazole, 2-mercapto-5-methylthio-1,3,4-thiadiazole, 2-(morpholinothio)benzothiazole, sodium salt of 2-mercaptobenzothiazole, zinc salt of 2-mercaptobenzothiazole, complex salt of dibenzothiazyldisulfide and zinc chloride, and the like.

(12) Sulfeneamides such as N-cyclohexyl-2-benzothiazylsulfeneamide, N-tert-butyl-2-benzothiazylsulfeneamide, N-tert-octyl-2-benzothiazylsulfeneamide, N-oxydiethylene-2-benzothiazylsulfeneamide, N,N-diethyl-2-benzothiazylsulfeneamide, N,N-diisopropyl-2-benzothiazylsulfeneamide, N,N-dicyclohexyl-2-benzothiazylsulfeneamide, and the like.

(13) Thiurams such as tetramethyl thiuram monosulfide, tetraethyl thiuram monosulfide, tetrabutyl thiuram monosulfide, dipentamethylene thiuram monosulfide, tetramethyl thiuram disulfide, tetraethyl thiuram disulfide, tetrabutyl thiuram disulfide, N,N'-dimethyl-N,N'-diphenyl thiuram disulfide, N,N'-diethyl-N,N'-diphenyl thiuram disulfide, dipentamethylene thiuram disulfide, dipentamethylene thiuramtetrasulfide, cyclic thiuram, and the like.

(14) Dithiocarbamates such as sodium dimethyldithiocarbamate, sodium diethyldithiocarbamate, sodium dibutyldithiocarbamate, sodium pentamethylenedithiocarbamate, sodium cyclohexylethyldithiocarbamate, potassium dimethyldithiocarbamate, lead dimethyldithiocarbamate, zinc dimethyldithiocarbamate, zinc diethyldithiocarbamate, zinc dibutyldithiocarbamate, zinc diphenyldithiocarbamate, zinc dibenzyldithiocarbamate, zinc pentamethylenedithiocarbamate, zinc dimethylpentamethylenedithiocarbamate, zinc ethylphenyldithiocarbamate, bismus dimethyldithiocarbamate, cadmium diethyldithiocarbamate, cadmium pentamethylenedithiocarbamate, selenium dimethyldithiocarbamate, selenium diethyldithiocarbamate, tellurium dimethyldithiocarbamate, tellurium diethyldithiocarbamate, iron dimethyldithiocarbamate, copper dimethyldithiocarbamate, diethylammonium diethyldithiocarbamate, N,N-cyclohexylammonium dibutyldithiocarbamate, piperidine pentamethylenedithiocarbamate, cyclohexylethylammonium sodium cyclohexylethyldithiocarbamate, pipecoline methylpentamethylenedithiocarbamate, pipecolium pipecolyldithiocarbamate, zinc N-phenyldithiocarbamate, complex compound of zinc pentamethylenedithiocarbamate and piperidine, and the like.

(15) Xanthogenates such as sodium isopropylxanthogenate, zinc isopropylxanthogenate, zinc butylxanthogenate, disulfidedibutylxanthogenate, and the like.

(16) Tertiary sulfonium salts such as trimethyl sulfonium bromide, triethyl sulfonium bromide, tri-n-butyl sulfonium chloride, tri-n-butyl sulfonium bromide, tri-n-butyl sulfonium iodide, tri-n-butyl sulfonium tetrafluoroborate, tri-n-hexyl sulfonium bromide, tri-n-octyl sulfonium bromide, triphenyl sulfonium chloride, triphenyl sulfonium bromide, triphenyl sulfonium iodide, and the like.

(17) Secondary iodonium salts such as diphenyl iodonium chloride, diphenyl iodonium bromide, diphenyl iodonium iodide, and the like.

(18) Mineral acids such as hydrochloric acid, sulfuric acid, nitric acid, phosphoric acid, carbonic acid and the like, and half-esters thereof.

(19) Lewis acids represented by boron trifluoride, etherate of boron trifluoride and the like.

(20) Organic acids and half-esters thereof.

(21) Silicic acid, tetrafluoroboric acid.

(22) Peroxides such as cumylperoxyneodecanoate, diisopropylperoxydicarbonate, diallylperoxydicarbonate, di-n-propylperoxydicarbonate, dimyristylperoxydicarbonate, cumylperoxyneohexanoate, tert-hexylperoxyneodecanoate, tert-butylperoxyneodecanoate, tert-hexylperoxyneohexanoate, tert-butylperoxyneohexanoate, 2,4-dichlorobenzoylperoxide, benzoylperoxide, dicumylperoxide, di-ter-butylperoxide, and the like; and peroxides such as cumenehydroperoxide, tert-butylhydroperoxide, and the like.

(23) Azo-based compounds such as 2,2'-azobis(4-methoxy-2,4-dimethylvaleronitrile), 2,2'-azobis(2-cyclopropylpropionitrile), 2,2'-azobis(2,4-dimethylvaleronitrile), 2,2'-azobisisobutyronitrile, 2,2'-azobis(2-methylbutyronitrile), 1,1'-azobis(cyclohexane-1-carbonitrile), 1-[(1-cyano-1-methylethyl)azo]formamide, 2-phenylazo-4-methoxy-2,4-dimethyl-valeronitrile, 2,2'-azobis(2-methylpropane), 2,2'-azobis(2,4,4-trimethylpentane), and the like.

(24) Acidic phosphoric acid esters such as mono- and/or dimethylphosphoric acid, mono- and/or diethylphosphoric acid, mono- and/or dipropylphosphoric acid, mono- and/or dibutylphosphoric acid, mono- and/or dihexylphosphoric acid, mono- and/or dioctylphosphoric acid, mono- and/or didecylphosphoric acid, mono- and/or didodecylphosphoric acid, mono- and/or diphenylphosphoric acid, mono- and/or dibenzylphosphoric acid, mono- and/or didecanolphosphoric acid, and the like.

In the above, examples of the (d) compound have been shown. The (d) compound is not limited to the above-listed compounds and may be anything which is polymerized and cured. These (d) compounds may be used independently or as a mixture of two or more. Among these, preferable specific examples include quaternary ammonium salts such as tetra-n-butylammonium bromide, triethylbenzylammonium chloride, cetyldimethylbenzylammonium chloride, 1-n-dodecylpyridinium chloride, and the like; and quaternary phosphonium salts such as tetra-n-butylphosphonium bromide, tetraphenylphosphonium bromide, and the like. Among these, further preferable specific examples are triethylbenzylammonium chloride and tetra-n-butylphosphonium bromide. The most preferable specific example is tetra-n-butylphosphonium bromide.

Where the (a) compound and the (b) compound have a total amount of 100 parts by weight, the (d) compound is contained in an amount of 0.001 to 5 parts by weight, preferably 0.002 to 5 parts by weight, and more preferably 0.005 to 3 parts by weight.

When polymerizing and thus curing a composition for a resin according to the present invention, an (e) compound as a polymerization adjusting agent can be added when necessary for the purpose of extending the pot life, dispersing the heat generated by the polymerization and the like. Usable polymerization adjusting agents include groups-XIII to XVI halides in the long-form periodic table. Representative specific examples of the (e) compound will be listed below.

(1) Halides of silane such as silicon tetrachloride, methyltrichlorosilane, dimethyldichlorosilane, trimethylchlorosilane, ethyltrichlorosilane, diethyldichlorosilane, triethylchlorosilane, propyltrichlorosilane, dipropyldichlorosilane, tripropylchlorosilane, n-butyltrichlorosilane, di-n-butyldichlorosilane, tri-n-butylchlorosilane, t-butyltrichlorosilane, di-t-butyldichlorosilane, tri-t-butylchlorosilane, octyltrichlorosilane, dioctyldichlorosilane, trioctylchlorosilane, phenyltrichlorosilane, diphenyldichlorosilane, triphenylchlorosilane, allylchlorodimethylsilane, trichloroallylsilane, t-butylchlorodimethylsilane, diphenyl-t-butylchlorosilane, t-butoxychlorodiphenylsilane, trimethyl(2-chloroallyl)silane, trimethylchloromethylsilane, n-butylchlorodimethylsilane, compounds in which the chlorine of any of these compounds is entirely or partially substituted with fluorine, bromine or iodine, and the like.

(2) Halides of germanium such as germanium tetrachloride, methyl germanium trichloride, dimethyl germanium dichloride, trimethyl germanium chloride, ethyl germanium trichloride, diethyl germanium dichloride, triethyl germanium chloride, propyl germanium trichloride, dipropyl germanium dichloride, tripropyl germanium chloride, n-butyl germanium trichloride, di-n-butyl germanium dichloride, tri-n-butyl germanium chloride, t-butyl germanium trichloride, di-t-butyl germanium dichloride, tri-t-butyl germanium chloride, amyl germanium trichloride, diamyl germanium dichloride, triamyl germanium chloride, octyl germanium trichloride, dioctyl germanium dichloride, trioctyl germanium chloride, phenyl germanium trichloride, diphenyl germanium dichloride, triphenyl germanium chloride, toluyl germanium trichloride, ditoluyl germanium dichloride, tritoluyl germanium chloride, benzyl germanium trichloride, dibenzyl germanium dichloride, tribenzyl germanium chloride, cyclohexyl germanium trichloride, dicyclohexyl germanium dichloride, tricyclohexyl germanium chloride, vinyl germanium trichloride, divinyl germanium dichloride, trivinyl germanium chloride, allyltrichlorogermane, bis(chloromethyl)dimethylgermane, chloromethyltrichlorogermane, t-butyldimethylchlorogermane, carboxyethyltrichlorogermane, chloromethyltrimethylgermane, dichloromethyltrimethylgermane, 3-chloropropyltrichlorogermane, phenyldimethylchlorogermane, 3-(trichlorogermyl)propionyl chloride, compounds in which the chlorine of any of these compounds is entirely or partially substituted with fluorine, bromine or iodine, and the like.

(3) Halides of tin such as tin tetrachloride, diethyldichlorosilane, dimethyl tin dichloride, trimethyl tin chloride, ethyl tin trichloride, diethyl tin dichloride, triethyl tin chloride, propyl tin trichloride, dipropyl tin dichloride, tripropyl tin chloride, n-butyl tin trichloride, di-n-butyl tin dichloride, tri-n-butyl tin chloride, t-butyl tin trichloride, di-t-butyl tin dichloride, tri-t-butyl tin chloride, amyl tin trichloride, diamyl tin dichloride, triamyl tin chloride, octyl tin trichloride, dioctyl tin dichloride, trioctyl tin chloride, phenyl tin trichloride, diphenyl tin dichloride, triphenyl tin chloride, toluyl tin trichloride, ditoluyl tin dichloride, tri toluyl tin chloride, benzyl tin trichloride, dibenzyl tin dichloride, tribenzyl tin chloride, cyclohexyl tin trichloride, dicyclohexyl tin dichloride, tricyclohexyl tin chloride, vinyl tin trichloride, divinyl tin dichloride, trivinyl tin chloride, butylchlorodihydroxy tin, bis(2,4-pentadionate)dichlorotin, carbomethoxyethyltrichlorotin, chloromethyltrimethyl tin, diallyldichlorotin, dibutylbutoxychlorotin, tri-n-pentylchlorotin, compounds in which the chlorine of any of these compounds is entirely or partially substituted with fluorine, bromine or iodine, and the like.

(4) Halides of antimony such as antimony pentachloride, methyl antimony tetrachloride, dimethyl antimony trichloride, trimethyl antimony dichloride, tetramethyl antimony chloride, ethyl antimony tetrachloride, diethyl antimony trichloride, triethyl antimony dichloride, tetraethyl antimony chloride, butyl antimony tetrachloride, dibutyl antimony trichloride, tributyl antimony dichloride, tetrabutyl antimony chloride, phenyl antimony tetrachloride, diphenyl antimony trichloride, triphenyl antimony dichloride, tetraphenyl antimony chloride, compounds in which the chlorine of any of these compounds is entirely or partially substituted with fluorine, bromine or iodine, and the like.

(5) Chlorides such as aluminum chloride, indium chloride, thallium chloride, phosphorus trichloride, phosphorus pentachloride, bismus chloride and the like; compound in which the chlorine of any of these compounds is entirely or partially substituted with fluorine, bromine or iodine; compounds having halogen and a hydrocarbon group such as diphenylchloroboron, phenyldichloroboron, diethylchlorogallium, dimethylchloroindium, di ethylchlorothallium, diphenylchlorothallium, ethyldichlorophosphine, butyldichlorophosphine, triphenylphosphine dichloride, diphenylchloroarsenic, tetraphenylchloroarsenic, diphenyldichloroselenium, phenylchloroselenium, diphenyldichlorotellurium, and the like; compounds in which the chlorine of any of these compounds is entirely or partially substituted with fluorine, bromine or iodine; organic halides represented by halogen substitutes of hydrocarbon such as chlorophenol, dichlorophenol, trichlorophenol, chloroaniline, dichloroaniline, chloronitrobenzene, dichloronitrobenzene, chlorobenzene, dichlorobenzene, trichlorobenzene, chloroacetophenone, chlorotoluene, chloronitroaniline, chlorobenzylcyanide, chlorobenzaldehyde, chlorobenzotrichloride, chloronaphthalene, dichloronaphthalene, chlorothiophenol, dichlorothiophenol, methallyl chloride, benzyl chloride, chlorobenzylchloride, chloroacetic acid, dichloroacetic acid, trichloroacetic acid, chlorosuccinic acid, dichloride oxalate, triglycol dichloride, methanesulfonyl chloride, chlorobenzoic acid, chlorosalicylic acid, 4,5-dichlorophthalic acid, 3,5-dichlorosalicylic acid, isopropyl chloride, allyl chloride, epichlorohydrin, chloromethylthiirane, propylenechlorohydrin, chloranil, dichlorodicyanobenzoquinone, dichlorophene, dichloro-1,4-benzoquinone, dichlorobenzophenone, N-chlorophthalimide, 1,3-dichloro-2-propanol, methyl 2,3-dichloropropionate, p-chlorobenzenesulfonic acid, ethyl 2-chloropropionate, dichloromethane, chloroform, carbon tetrachloride, and the like; or represented by acidic chlorides such as chloride benzoate, chloride phthalate, chloride isophthalate, chloride terephthalate, chloride methacrylate, chloride succinate, chloride fumarate, chloride nicotinate, chloride chloronicotinate, chloride oleate, benzoyl chloride, chlorobenzoyl chloride, chloride propionate, and the like; other halogen compounds in which the chlorine of any of these compounds is entirely or partially substituted with fluorine, bromine or iodine; and the like.

These (e) compounds may be used independently or as a mixture of two or more. Among these, preferable examples are halides of silicon, germanium, tin and antimony. More preferable examples are chlorides of silicon, germanium, tin and antimony. Further preferable examples are chlorides of germanium, tin and antimony having an alkyl group. Most preferable specific examples are dibutyl tin dichloride, butyl tin trichloride, dioctyl tin dichloride, octyl tin trichloride, dibutyl dichlorogermanium, butyl trichlorogermanium, diphenyl dichlorogermanium, phenyl trichlorogermanium, and triphenyl antimony dichloride.

Where the (a) compound and the (b) compound have a total amount of 100 parts by weight, the (e) compound is contained in an amount of 0.001 to 5 parts by weight, preferably 0.002 to 5 parts by weight, and more preferably 0.005 to 3 parts by weight.

In the present invention, performing a preliminary polymerization reaction of the (a) compound and the (b) compound, after mixing these compounds, for 1 minute to 24 hours at 0° C. to 150° C. is effective means when the (a) compound is solid. The obtained optical material has a good transparency. In this process, a preliminary polymerization reaction catalyst may be added for promoting the reaction of the (a) compound and the (b) compound. Usable preliminary polymerization reaction catalysts include the (d) compounds described above. Among these, compounds containing a nitrogen or phosphorus atom are preferable. Compounds containing a nitrogen or phosphorus atom and having an unsaturated bond are more preferable. Imidazoles are especially preferable, and 2-mercapto-1-methylimidazole is most preferable. Where the (a) compound and the (b) compound have a total amount of 100 parts by weight, the preliminary polymerization reaction catalyst is contained in an amount of 0.001 to 5 parts by weight, preferably 0.002 to 5 parts by weight, and more preferably 0.005 to 3 parts by weight.

A method of adding a preliminary polymerization reaction catalyst to the (a) compound and the (b) compound for promoting the reaction of these compounds to cause the reaction will be specifically described, hereinafter. A part or the entirety of the (a) compound and a part or the entirety of the (b) compound are reacted with each other in the presence or absence of a preliminary polymerization reaction catalyst while being stirred or without being stirred at 0° C. to 150° C. for 1 minute to 72 hours to produce a composition for a resin. The reaction time is 1 minute to 72 hours, preferably 10 minutes to 48 hours, and more preferably 30 minutes to 24 hours. The reaction temperature is 0° C. to 150° C., more preferably 10° C. to 120° C., and more preferably 20° C. to 100° C. In addition, it is preferable to react 10% or greater of the (a) compound (where the reaction ratio before the reaction is 0%), and it is more preferable to react 20% or greater of the (a) compound, by this reaction. The reaction may be performed in the presence of a gas such as air, nitrogen, oxygen or the like, and at room temperature, in a sealed state at a raised or reduced pressure, or in any atmosphere at a reduced pressure. This reaction may be performed with use of a part or the entirety of the (c) compound, the (d) compound, the (e) compound, a compound which is reactable with a part or the entirety of a composition component and is usable as a performance improving agent described later, or any of various additives including an UV absorber. Processing the reaction product with liquid chromatography and/or viscosity measurement and/or specific gravity measurement and/or refractive index measurement is preferable to control the reaction proceeding degree and thus to obtain a uniform composition for a resin. Among these, the techniques of liquid chromatography and/or refractive index measurement have a high sensitivity and so are preferable. The technique of refractive index measurement is easy and simple and so is more preferable. For measuring the refractive index, it is preferable to use an inline type refractometer, which allows the reaction proceeding degree to be checked in real time.

For the purpose of improving the performance of oxidation resistance, weather resistance, dyeability, strength, refractive index or other parameters, the composition may be polymerized and cured with addition of a compound reactable with a part or the entirety of a compound which is a composition component. In such a case, a known polymerization catalyst may be separately added when necessary in order to promote the reaction.

Examples of the compound reactable with a part or the entirety of a composition component include compounds having an SH group, epoxy compounds, iso(thio)cyanates, carboxylic acids, carboxylic acid anhydrides, phenols, amines, vinyl compounds, allyl compounds, acrylic compounds, methacrylic compounds, and the like. Representative specific examples of these compounds will be listed below.

(1) Compounds having an SH group such as bis(2-mercaptoethyl)sulfide, bis(2,3-dimercaptopropyl)sulfide, 1,2-bis(2-mercaptoethylthio)ethane, 2-(2-mercaptoethylthio)-1,3-dimercaptopropane, 1,2-bis(2-mercaptoethylthio)-3-mercaptopropane, 4-mercaptomethyl-1,8-dimercapto-3,6-dithiaoctane, 2,4-bis(mercaptomethyl)-1,5-dimercapto-3-thiapentane, 4,8-bis(mercaptomethyl)-1,11-dimercapto-3,6,9-trithiaundecane, 4,7-bis(mercaptomethyl)-1,11-dimercapto-3,6,9-trithiaundecane, 5,7-bis(mercaptomethyl)-1,11-dimercapto-3,6,9-trithiaundecane, 1,2,7-trimercapto-4,6-dithiaheptane, 1,2,9-trimercapto-4,6,8-trithianonane, 1,2,8,9-tetramercapto-4,6-dithianonane, 1,2,10,11-tetramercapto-4,6,8-trithiaundecane, 1,2,12,13-tetramercapto-4,6,8,10-tetrathiatridecane, tetrakis(4-mercapto-2-thiabutyl)methane, tetrakis(7-mercapto-2,5-dithiaheptyl)methane, 1,5-dimercapto-3-mercaptomethylthio-2,4-dithiapentane, 3,7-bis(mercaptomethylthio)-1,9-dimercapto-2,4,6,8-tetrathianonane, 2,5-bis(mercaptomethyl)-1,4-dithiane, 2,5-bis(2-mercaptoethyl)-1,4-dithiane, 2,5-bis(mercaptomethyl)-1-thiane, 2,5-bis(2-mercaptoethyl)-1-thiane, bis(4-mercaptophenyl)sulfide, bis(4-mercaptomethylphenyl)sulfide, 3,4-thiophenedithiol, and the like.

(2) Epoxy compounds such as, for example, monoepoxy compounds such as ethylene oxide, propylene oxide, and the like; phenol-based epoxy compounds produced by condensation of epihalohydrin and any of polyhydric phenol compounds such as hydroquinone, catechol, resorcin, bisphenol A, bisphenol F, bisphenolether, bisphenol A halide, novolac resin, and the like; alcohol-based epoxy compounds produced by condensation of epihalohydrin and any of alcohol compounds such as methanol, ethanol, propanol, butanol, ethyleneglycol, diethyleneglycol, triethyleneglycol, polyethyleneglycol, propyleneglycol, dipropyleneglycol, polypropyleneglycol, 1,3-propanediol, 1,4-butanediol, 1,6-hexanediol, neopentylglycol, glycerine, trimethylolpropane, pentaerythritol, 1,3- and 1,4-cyclohexanediol, 1,3- and 1,4-cyclohexanedimethanol, hydrogenated bisphenol A, bisphenol A-ethylene oxide adduct, bisphenol A-propylene oxide adduct, and the like; urethane-based epoxy compounds produced from the above-mentioned alcohol or phenol compound and diisocyanate, etc.; glycidyl ester-based epoxy compounds produced by condensation of epihalohydrin and any of carboxylic compounds such as acetic acid, propionic acid, benzoic acid, adipic acid, sebacic acid, dodecanedicarboxylic acid, dimer acid, phthalic acid, isoterephthalic acid, tetrahydrophthalic acid, methyltetrahydrophthalic acid, hexahydrophthalic acid, chlorendic acid, nadic acid, maleic acid, succinic acid, fumaric acid, trimellitic acid, benzenetetracarboxylic acid, benzophenonetetracarboxylic acid, naphthalenedicarboxyilc acid, diphenyldicarboxylic acid, acrylic acid, methacrylic acid, maleic acid, fumaric acid, and the like; amine-based epoxy compounds produced by condensation of epihalohydrin and ethylenediamine, 1,2-diaminopropane, 1,3-diaminopropane, 1,2-diaminobutane, 1,3-diaminobutane, 1,4-diaminobutane, 1,5-diaminopentane, 1,6-diaminohexane, 1,7-diaminoheptane, 1,8-diaminooctane, bis-(3-aminopropyl)ether, 1,2-bis-(3-aminopropoxy)ethane, 1,3-bis-(3-aminopropoxy)-2,2'-dimethylpropane, 1,2-, 1,3- or 1,4-bisaminocyclohexane, 1,3- or 1,4-bisaminomethylcyclohexane, 1,3- or 1,4-bisaminoethylcyclohexane, 1,3- or 1,4-bisaminopropylcyclohexane, hydrogenated 4,4'-diaminodiphenylmethane, isophoronediamine, 1,4-bisaminopropylpiperazine, m- or p-phenylenediamine, 2,4- or 2,6-tolylenediamine, m- or p-xylylenediamine, 1,5- or 2,6-naphthalenediamine, 4,4'-diaminodiphenylmethane, 4,4'-diaminodiphenylether, 2,2-(4,4'-diaminodiphenyl)propane, N,N'-dimethylethylenediamine, N,N'-dimethyl-1,2-diaminopropane, N,N'-dimethyl-1,3-diaminopropane, N,N'-dimethyl-1,2-diaminobutane, N,N'-dimethyl-1,3-diaminobutane, N,N'-dimethyl-1,4-diaminobutane, N,N'-dimethyl-1,5-diaminopentane, N,N'-dimethyl-1,6-diaminohexane, N,N-dimethyl-1,7-diaminoheptane, N,N'-diethylethylenediamine, N,N'-diethyl-1,2-diaminopropane, N,N'-diethyl-1,3-diaminopropane, N,N'-diethyl-1,2-diaminobutane, N,N'-diethyl-1,3-diaminobutane, N,N'-diethyl-1,4-diaminobutane, N,N'-diethyl-1,6-diaminohexane, piperazine, 2-methylpiperazine, 2,5- or 2,6-dimethylpiperazine, homopiperazine, 1,1-di-(4-piperidyl)-methane, 1,2-di-(4-piperidyl)-ethane, 1,3-di-(4-piperidyl)-propane, or 1,4-di-(4-piperidyl)-butane; sulfur-containing epoxy compounds such as bis(β-epoxypropyl)sulfide, bis(β-epoxypropyl)disulfide, bis(β-epoxypropylthio)methane, bis(β-epoxypropyldithio)methane, 1,2-bis(β-epoxypropylthio)ethane, 1,3-bis(β-epoxypropylthio)propane, 1,2-bis(β-epoxypropylthio)propane, 1-(β-epoxypropylthio)-2-(β-epoxypropylthiomethyl)propane, 1,4-bis(β-epoxypropylthio)butane, 1,3-bis(β-epoxypropylthio)butane, 1-(β-epoxypropylthio)-3-(β-epoxypropylthiomethyl)butane, 1,5-bis(β-epoxypropylthio)pentane, 1-(β-epoxypropylthio)-4-(β-epoxypropylthiomethyl)pentane, 1,6-bis(β-epoxypropylthio)hexane, 1-(β-epoxypropylthio)-5-(β-epoxypropylthiomethyl)hexane, 1-(β-epoxypropylthio)-2-[(2-β-epoxypropylthioethyl)thio]ethane, 1-(β-epoxypropylthio)-2-[[2-(2-β-epoxypropylthioethyl)thioethyl]thio]ethane, tetrakis(β-epoxypropylthiomethyl)methane, 1,1,1-tris(β-epoxypropylthiomethyl)propane, 1,5-bis(β-epoxypropylthio)-2-(β-epoxypropylthiomethyl)-3-thiapentane, 1,5-bis(β-epoxypropylthio)-2,4-bis(β-epoxypropylthiomethyl)-3-thiapentane, 1-(β-epoxypropylthio)-2,2-bis(β-epoxypropylthiomethyl)-4-thiahexane, 1,5,6-tris(β-epoxypropylthio)-4-(β-epoxypropylthiomethyl)-3-thiahexane, 1,8-bis(β-epoxypropylthio)-4-(β-epoxypropylthiomethyl)-3,6-dithiaoctane, 1,8-bis(β-epoxypropylthio)-4,5-bis(β-epoxypropylthiomethyl)-3,6-dithiaoctane, 1,8-bis(β-epoxypropylthio)-4,4-bis(β-epoxypropylthiomethyl)-3,6-dithiaoctane, 1,8-bis(β-epoxypropylthio)-2,4,5-tris(β-epoxypropylthiomethyl)-3,6-dithiaoctane, 1,8-bis(β-epoxypropylthio)-2,5-bis(β-epoxypropylthiomethyl)-3,6-dithiaoctane, 1,9-bis(β-epoxypropylthio)-5-(β-epoxypropylthiomethyl)-5-[(2-β-epoxypropylthioethypthiomethyl]-3,7-dithianonane, 1,10-bis(β-epoxypropylthio)-5,6-bis[(2-β-epoxypropylthioethyl)thio]-3,6,9-trithiadecane, 1,11-bis(β-epoxypropylthio)-4,8-bis(β-epoxypropylthiomethyl)-3,6,9-trithiaundecane, 1,11-bis(β-epoxypropylthio)-5,7-bis(β-epoxypropylthiomethyl)-3,6,9-trithiaundecane, 1,11-bis(β-epoxypropylthio)-5,7-[(2-β-epoxypropylthioethyl)thiomethyl]-3,6,9-trithiaundecane, 1,11-bis(β-epoxypropylthio)-4,7-bis(β-epoxypropylthiomethyl)-3,6,9-trithiaundecane, 1,3 and 1,4-bis(β-epoxypropylthio)cyclohexane, 1,3 and 1,4-bis(β-epoxypropylthiomethyl)cyclohexane, bis[4-(β-epoxypropylthio)cyclohexyl]methane, 2,2-bis[4-(β-epoxypropylthio)cyclohexyl]propane, bis[4-(β-epoxypropylthio)cyclohexyl]sulfide, 2,5-bis(β-epoxypropylthiomethyl)-1,4-dithiane, 2,5-bis(β-epoxypropylthioethylthiomethyl)-1,4-dithiane, 1,3 and 1,4-bis(β-epoxypropylthio)benzene, 1,3 and 1,4-bis(β-epoxypropylthiomethyl)benzene, bis[4-(β-epoxypropylthio)phenyl]methane, 2,2-bis[4-(β-epoxypropylthio)phenyl]propane, bis[4-(β-epoxypropylthio)phenyl]sulfide, bis[4-(β-epoxypropylthio)phenyl]sulfone, 4,4'-bis(β-epoxypropylthio)biphenyl, and the like; alicyclic epoxy compounds such as 3,4-epoxycyclohexyl-3,4-epoxycyclohexanecarboxylate, vinylcyclihexanedioxide, 2-(3,4-epoxycyclohexyl)-5,5-spiro-3,4-epoxycyclohexane-meta-dioxane, bis(3,4-epoxycyclohexyl)adipate, and the like; epoxy compounds produced by epoxylation of any of unsaturated compounds such as cyclopentadiene epoxide, epoxylated soybean oil, epoxylated polybutadiene, vinylcyclohexene epoxide, and the like; and epoxy compounds having an unsaturated group such as vinylphenylglycidylether, vinylbenzylglycidylether, glycidylmethacrylate, glycidylacrylate, allylglycidylether, and the like.

(3) Isocyanates such as, for example, monoisocyanates such as methylisocyanate, ethylisocyanate, propylisocyanate, iso-propylisocyanate, n-butylisocyanate, sec-butylisocyanate, tert-butylisocyanate, pentylisocyanate, hexylisocyanate, octylisocyanate, dodecylisocyanate, cyclohexylisocyanate, phenylisocyanate, toluylisocyanate, and the like; polyisocyanates such as diethylenediisocyanate, tetramethylenediisocyanate, hexamethylenediisocyanate, trimethylhexamethylenediisocyanate, cyclohexanediisocyanate, 1,3-bis(isocyanatomethyl)cyclohexane, 1,4-bis(isocyanatomethyl)cyclohexane, isophoronediisocyanate, 2,5-bis(isocyanatomethyl)norbornene, 2,6-bis(isocyanatomethyl)decahydronaphthalene, 2,5-diisocyanato-1,4-dithiane, 2,5-bis(isocyanatomethyl)-1,4-dithiane, 2,6-bis(isocyanatomethyl)-1,4-dithiane, lysinetriisocyanate, 2,4-tolylenediisocyanate, 2,6-tolylenediisocyanate, o-tolidinediisocyanate, 4,4'-diphenylmethanediisocyanate, diphenyletherdiisocyanate, 3-(2'-isocyanatecyclohexyl)propylisocyanate, tris(phenylisocyanate)thiophosphate, isopropylidenebis(cyclohexylisocyanate), 2,2'-bis(4-isocyanatephenyl)propane, triphenylmethanetriisocyanate, bis(diisocyanatetolyl)phenylmethane, 4,4',4''-triisocyanate-2,5- dimethoxyphenylamine, 3,3'-dimethoxybenzidine-4,4'-diisocyanate, 1,3-phenylenediisocyanate, 1,4-phenylenediisocyanate, 4,4'-diisocyanatobiphenyl, 4,4'-diisocyanato-3,3'-dimethylbiphenyl, dicyclohexylmethane-4,4'-diisocyanato, 1,1'-methylenebis(4-isocyanatobenzene), 1,1'-methylenebis(3-methyl-4-isocyanatobenzene), m-xylylenediisocyanate, p-xylylenediisocyanate, 1,3-bis(1-isocyanate-1-methylethyl)benzene, 1,4-bis(1-isocyanate-1-methylethyl)benzene, 1,3-bis(2-isocyanato-2-propyl)benzene, 2,6-bis(isocyanatomethyl)naphthalene, 1,5-naphthalenediisocyanate, bis(isocyanatemethyl)tetrahydrodicyclopentadiene, bis(isocyanatemethyl)dicyclopentadiene, bis(isocyanatemethyl)tetrahydrothiophene, bis(isocyanatemethyl)thiophene, 2,5-diisocyanatemethylnorbornene, bis(isocyanatemethyl)adamantane, 3,4-diisocyanateselenophane, 2,6-diisocyanate-9-selenabicyclononane, bis(isocyanatemethyl)selenophane, 3,4-diisocyanate-2,5-diselenolane, dimer acid diisocyanate, 1,3,5-tri(1-isocyanatohexyl)isocyanuric acid and the like; dimers produced by burette reaction of any of these polyisocyanates; cyclizated trimers of any of these polyisocyanates; and adducts of any of these polyisocyanates and alcohol or thiol; and also isothiocyanates obtained by changing the entirety or a part of an isocyanate group of a compound having at least one isocyanate group mentioned above per molecule into an isothiocyanate group.

(4) Carboxylic acids listed regarding the epoxy compounds in section (2) as examples of materials which may be reacted with epihalohydrin.

(5) Carboxylic acid anhydrides listed regarding the epoxy compounds in section (2) as examples of materials which may be reacted with epihalohydrin.

(6) Phenols listed regarding the epoxy compounds in section (2) as examples of materials which may be reacted with epihalohydrin.

(7) Amines listed regarding the epoxy compounds in section (2) as examples of materials which may be reacted with epihalohydrin.

(8) Vinyl compounds such as vinylether, ethylvinylether, isobutylvinylether, 2-ethylhexylvinylether, phenylvinylether, benzylvinylether, 2-chloroethylvinylether, cyclohexylvinylether, vinylglycidylether, vinylalcohol, methylvinylcarbinol, ethyleneglycol monovinylether, ethyleneglycol divinylether, diethyleneglycol monovinylether, diethyleneglycol divinylether, tetramethyleneglycol monovinylether, divinyl sulfide, vinylethyl sulfide, vinylphenyl sulfide, methylvinylketone, divinyl dicarbonate, vinyldiglycol carbonate, vinylene carbonate, vinyl acetate, vinyl chloroacetate, vinyl propionate, vinyl butyrate, vinyl hexanate, vinyl 2-ethylhexanoate, divinyl adipinate, vinyl benzoate, vinyl salicylate, vinyl acrylate, vinyl methacrylate, vinyl bromide, vinyl iodide, vinylphophoric acid, vinylurea, styrene, 2-methylstyrene, 3-methylstyrene, 4-methylstyrene, α-methylstyrene, 2,4,6-trimethylstyrene, 4-t-butylstyrene, stilbene, vinylphenol, 3-vinylbenzylalcohol, 4-vinylbenzylalcohol, 2-(4-vinylphenylthio)ethanol, 2-(3-vinylphenylthio)ethanol, 2-(4-vinylbenzylthio)ethanol, 2-(3-vinylbenzylthio)ethanol, 1,3-bis(4-vinylbenzylthio)-2-propanol, 1,3-bis(3-vinylbenzylthio)-2-propanol, 2,3-bis(4-vinylbenzylthio)-1-propanol, 2,3-bis(3-vinylbenzylthio)-1-propanol, cinnamyl alcohol, cinnamaldehyde, 1,3-divinylbenzene, 1,4-divinylbenzene, trivinylbenzene, divinyl phthalate, 2-chlorostyrene, 3-chlorostyrene, 4-chlorostyrene, 3-chloromethylstyrene, 4-chloromethylstyrene, 4-aminostyrene, 3-cyanomethyl styrene, 4-cyanomethylstyrene, 4-vinylbiphenyl, 2,2'-divinylbiphenyl, 4,4'-divinylbiphenyl, 2,2'-distylylether, 4,4'-distylylether, 2,2'-distylylsulfide, 4,4'-distylylsulfide, 2,2-bis(4-vinylphenyl)propane, bis(4-vinylphenyl)ether, 2,2-bis(4-vinyloxyphenyl)propane, and the like.

(9) Allyl compounds in which a part or the entirety of the vinyl group of the compounds listed regarding the vinyl compounds in section (8) as examples is substituted with an allyl group.

(10) Acrylic compounds such as methyl acrylate, ethyl acrylate, propyl acrylate, butyl acrylate, cyclohexyl acrylate, 2-hydroxyethyl acrylate, 3-hydroxypropyl acrylate, 2-hydroxypropyl acrylate, 3-phenoxy-2-hydroxypropyl acrylate, trimethylolpropane monoacrylate, 2-hydroxyethylisocyanurate monoacrylate, 2-hydroxyethylisocyanurate diacrylate, 2-hydroxyethylcyanurate monoacrylate, 2-hydroxyethylcyanurate diacrylate, ethyleneglycol diacrylate, diethyleneglycol diacrylate, 1,3-butyleneglycol diacrylate, triethyleneglycol diacrylate, polyethyleneglycol diacrylate, propyleneglycol diacrylate, 1,3-propanedioldiacrylate, 1,3-butanedioldiacrylate, 1,4-butanedioldiacrylate, 1,6-hexanedioldiacrylate, neopentylglycol diacrylate, polypropyleneglycol diacrylate, 2-hydroxy-1,3-diacryloxypropane, 2,2-bis[4-(acryloxyethoxy)phenyl]propane, 2,2-bis[4-(acryloxyethoxy)cyclohexyl]propane, 2,2-bis[4-(2-hydroxy-3-acryloxypropoxy)phenyl]propane, 2,2-bis[4-(acryloxy.diethoxy)phenyl]propane, 2,2-bis[4-(acryloxy.polyethoxy)phenyl]propane, trimethylolpropane triacrylate, pentaerythritol monoacrylate, pentaerythritol diacrylate, pentaerythritol triacrylate, pentaerythritol tetraacrylate, pentaacrylate of bis(2,2,2-trimethylolethyl)ether, hexaacrylate of bis(2,2,2-trimethylolethyl)ether, bis(4-acroylthiophenyl)sulfide, and the like.

(11) Methacrylic compounds in which a part or the entirety of the acrylic group of the compounds listed regarding the acrylic compounds in section (10) as examples is changed into a methacrylic group.

In a method for producing an optical material according to the present invention, it is certainly possible to add any of various additives including a known antioxidant, bluing agent, UV absorber, deodorant, perfume and the like to improve the practicality of the material to be obtained. It is effective to improve the adhesiveness or releasability of the optical material to be obtained according to the present invention and the mold as follows. In the case where the optical material is likely to come off from the mold during the polymerization, a known external and/or internal adhesiveness improving agent is added. In the case where the optical material is unlikely to be released from the mold, a known external and/or internal releasability improving agent is added.

Performing degassing in advance on a composition for a resin according to the present invention is preferable for achieving a high transparency of the optical material. The degassing is performed before, during, or after mixing the (a) compound, the (b) compound, the (c) compound, a compound reactable with a part or the entirety of a composition component, the (d) compound, the (e) compound, and any of various additives, at a reduced pressure. Preferably, the degassing is performed during or after the mixing at a reduced pressure. The degassing is performed under reduced pressure of 0.001 to 500 torr for 1 minute to 24 hours at 0° C. to 100° C. The pressure reduction degree is preferably 0.005 to 250 torr, and more preferably 0.01 to 100 torr. The pressure reduction degree may be varied in such ranges. The degassing time is preferably 5 minutes to 18 hours, and more preferably 10 minutes to 12 hours. The temperature at the time of degassing is preferably 5° C. to 80° C., and more preferably 10° C. to 60° C. The temperature may be varied in such ranges. During the degassing, renewing the interface of the composition for a resin by stirring, gas blowing, vibration using ultrasonic is preferable for improving the effect of the degassing. The components removed by the degassing are mainly, for example, a dissolved gas such as hydrogen sulfide, a low boiling point substance such as mercaptan having a small molecular weight or the like. There is no specific limitation on the type of components to be removed as long as the effect of the degassing is provided.

A method for producing an optical material according to the present invention is specifically as follows. The reaction product obtained by performing a preliminary polymerization reaction on the (a) compound and the (b) compound and/or on a mixture of the (a) compound and the (b) compound, the (c) compound, a compound reactable with a part or the entirety of a composition component, the (d) compound, the (e) compound, and any of various additives including an adhesiveness improving agent or a releasability improving agent, an antioxidant, a bluing agent, an UV absorber, a deodorant, perfume and the like may be all mixed at the same time in the same container while being stirred. Alternatively, each of these substances may be added and mixed step by step. Still alternatively, groups of the substances may be first separately mixed and then all the substances may be mixed together in the same container. The materials and the additives, etc. may be mixed in any order. Still alternatively, two or more types of each component may be preliminarily reacted in advance and then the components may be mixed. For mixing, there is basically no specific limitation on the set temperature, time and the like as long as the components can be fully mixed. It is not appropriate to set an excessively high or low temperature or an excessively long or short time because in such a case, for example, an undesirable reaction of additives occurs and the viscosity is increased to make the cast operation difficult. The mixture needs to be performed in a temperature range of −50° C. to 100° C., preferably of −30° C. to 70° C., and more preferably of −5° C. to 50° C. The mixing time is approximately 1 minute to 12 hours, preferably approximately 5 minutes to 10 hours, and most preferably approximately 5 minutes to 6 hours. When necessary, the active energy beam may be blocked when performing the mixture. After that, degassing may be performed in the above-described method. Filtrating the composition for a resin with a filter to remove impurities and the like for purification immediately after the cast operation is necessary to further improve the quality of the optical material according to the present invention. The pore diameter of the filter to be used for the present invention is about 0.05 to 10 µm, and generally a filter having a pore diameter of 0.1 to 5 µm is usable. Regarding the type of the filter, PTFE, PET, PP and the like are preferably usable. If the filtration is not performed or the filtration is performed with a filter having a pore diameter exceeding 10 µm, the composition for a resin may be contaminated with foreign substances or the transparency of the optical material may be deteriorated. Usually, such a composition is not usable for an optical material.

The composition for a resin obtained in this manner is injected into a glass or metal mold and then polymerized and cured in an electric oven, an active energy beam generation apparatus or the like. The polymerization time is 0.1 to 100 hours, and usually 1 to 48 hours. The polymerization temperature is −10 to 160° C., and usually −10 to 140° C. The polymerization may be performed by holding the temperature at a predetermined level for a predetermined time, raising the temperature at a rate of 0.1° C. to 100° C./hour and lowering the temperature at a rate of 0.1° C. to 100° C./hour, or a combination thereof. Annealing the material at a temperature of 50 to 150° C. for about 5 minutes to 5 hours after the polymerization is preferable for removing the distortion of the optical material. When necessary, surface treatment such as dyeing, hard-coating, reflection prevention, anti-fog property provision, anti-contamination property provision, anti-impact property provision or the like may be performed.

EXAMPLES

Hereinafter, the present invention will be specifically described by way of examples, but the present invention is not limited to these examples. The viscosity of each composition for a resin, and the refractive index, the Abbe number, the heat resistance and the tonality of each obtained cured substance (optical material) were measured by the following methods.

The viscosity was measured at 30° C. by a B-type viscometer (DV-II+Pro produced by Toki Sangyo Co., Ltd. using cone rotor CRE-40). In general, when the viscosity of the composition for a resin is 200 mPa·s or less, the composition can be filtrated during a cast polymerization operation. When the viscosity thereof exceeds 300 mPa·s, it is difficult to filtrate the composition. When the viscosity thereof exceeds 500 mPa·s, it is impossible to filtrate the composition.

$$v_d = (n_d - 1)/(n_F - n_c)$$

The refractive index ($n_e$) and the Abbe number ($v_d$) were measured at 25° C. by a digital precision refractometer (KPR-200 produced by Kalnew Kogaku Kogyo K.K.).

The heat resistance was measured as follows. Each sample was cut to have a thickness of 3 mm. A weight of 10 g was applied to a pin having a diameter of 0.5 mm, and the temperature was raised from 30° C. at a rate of 10° C./min. TMA measurement (TMA/SS6100 produced by Seiko Instruments Inc.) was performed to find the softening point.

The tonality was measured as follows. Using a spectral colorimeter (JS555 produced by Color Techno System Corporation), the YI value of light transmitted through a 2.5 mm-thick flat plate was measured.

Material Monomers:
Bis(β-epithiopropyl)sulfide and bis(β-epithiopropyl)disulfide as the (b) compound were respectively synthesized in accordance with the production methods described in Japanese Patent No. 3491660 and E. P. Adams et al., J. Chem. Soc., page 2665 (1960).

Namely, bis(β-epithiopropyl)sulfide was produced by reacting epichlorhydrin, sodium hydrosulfide and caustic soda to obtain bis(β-epoxypropyl)sulfide, and then reacting this with thiourea. Bis(β-epithiopropyl)disulfide was synthesized by oxidizing 3-mercaptopropylenesulfide with iodine.

Bis(mercaptomethyl)disulfide and bis(dimercaptomethyl)disulfide as the (c) compound were each synthesized in accordance with the production method of disulfide using oxidation described in "Jikken Kagaku Koza 17—Yuki Kagobutsu no Gosei I" (Experimental Science Course 17—Synthesis of Organic Compounds I), Book 1, page 214 (1957) edited by The Chemical Society of Japan and published by Maruzen Co., Ltd.

Namely, bis(mercaptomethyl)disulfide was synthesized by oxidizing methanedithiol with iodine and purifying the resultant substance by distillation (the boiling point was 85-88° C./0.3 torr). Bis(dimercaptomethyl)disulfide was synthesized by oxidizing methanetrithiol with iodine and purifying the resultant substance by distillation (the boiling point was 108-112° C./0.3 torr).

Example 1

29 parts by weight of sulfur as the (a) compound (hereinafter, referred to as the "a-1 compound"), 71 parts by weight of bis(β-epithiopropyl)sulfide as the (b) compound (hereinafter, referred to as the "b-1 compound"), and 14 parts by weight of bis(mercaptomethyl)disulfide as the (c) compound (hereinafter, referred to as the "c-1 compound") were mixed well at 50° C. to be uniform. Next, 0.15 parts by weight of 2-mercapto-1-methylimidazole as a preliminary polymerization reaction catalyst was added to the mixture. While the mixture was stirred well at 50° C., a preliminary polymerization reaction was performed on the mixture until sulfur was not deposited even when the mixture was cooled down to 30° C. The time required to finish the reaction was 30 minutes. Then, to this preliminarily polymerized composition for a resin, 1 part by weight of the c-1 compound (15 parts by weight in total), 0.03 parts by weight of tetrabutylphosphonium bromide as the (d) compound, and 0.1 parts by weight of di-n-butyl tin dichloride as the (e) compound were added at 30° C. and mixed well to obtain a uniform mixture. This mixture was deaerated under the conditions of 100 torr and 30° C. for 10 minutes. Next, the deaerated composition for a resin was filtrated by a 5 μm PTFE membrane filter, injected into a 2.5 mm-thick flat plate-like mold formed of two glass plates and a gasket, and kept at 30° C. for 10 hours. Then, the temperature of this composition was raised at a constant rate from 30° C. to 100° C. over 10 hours. At the end of this process, the composition was heated at 100° C. for 1 hour to complete the polymerization reaction. After being left to be cooled down to room temperature, the composition was released from the mold. Thus, a cured optical material was obtained.

The viscosity of the composition for a resin after the degassing was 100 mPa·s. The viscosity of the composition for a resin after the composition was kept at 30° C. for 2 hours was 140 mPa·s. No significant increase of the viscosity was observed. The refractive index and the Abbe number of the obtained optical material were 1.776 and 30, respectively. The heat resistance (softening point) obtained by the TMA measurement was 120° C. or higher, and the tonality (YI value) was as low as 8.6. The evaluation results are shown in Table 1.

Example 2

The procedure of Example 1 was repeated except that 19 parts by weight, instead of 14 parts by weight, of the c-1 compound was incorporated. The evaluation results of the viscosity of the composition for a resin after the degassing and 2 hours later, and the refractive index, the Abbe number, the heat resistance and the tonality of the obtained optical material are shown in Table 1.

Comparative Example 1

The procedure of Example 1 was repeated except that the (c) compound was not used. After the degassing, the composition for a resin was gelated and no cured substance was obtained.

Comparative Example 2

The procedure of Example 1 was repeated except that 10 parts by weight of bis(2-mercaptoethyl)sulfide (hereinafter, referred to as the "o-1 compound") having two SH groups was used, instead of the c-1 compound as the (c) compound. After the degassing, the composition for a resin was gelated and no cured substance was obtained.

Comparative Example 3

The procedure of Example 1 was repeated except that 10 parts by weight of benzylmercaptan (hereinafter, referred to as the "o-2 compound") having one SH group was used, instead of the c-1 compound as the (c) compound. The composition for a resin after the degassing had a high viscosity of 220 mPa·s and needed a very long time to be filtrated. The evaluation results of the refractive index, the Abbe number, the heat resistance and the tonality of the obtained optical material are shown in Table 1. As compared with the examples, the refractive index was low and the tonality was inferior.

Comparative Example 4

The procedure of Example 1 was repeated except that 10 parts by weight of diphenyldisulfide (hereinafter, referred to as the "o-3 compound") having a disulfide bond was used, instead of the c-1 compound as the (c) compound. The composition for a resin after the degassing had a high viscosity of 200 mPa·s and needed a very long time to be filtrated. The evaluation results of the refractive index, the Abbe number, the heat resistance and the tonality of the obtained optical material are shown in Table 1. As compared with the examples, the refractive index was low and the tonality was inferior.

Comparative Example 5

The procedure of Comparative example 3 was repeated except that 35 parts by weight of the a-1 compound, 65 parts by weight of the b-1 compound, and 10 parts by weight of the o-2 compound were used. The composition for a resin after the degassing had a high viscosity of 380 mPa·s and needed a very long time to be filtrated. The evaluation results of the refractive index, the Abbe number, the heat resistance and the tonality of the obtained optical material are shown in Table 1. The refractive index was raised but the tonality was significantly deteriorated.

Comparative Example 6

The procedure of Comparative example 4 was repeated except that 35 parts by weight of the a-1 compound, 65 parts by weight of the b-1 compound, and 10 parts by weight of the o-3 compound were used. The composition for a resin after the degassing had a high viscosity of 350 mPa·s and needed a very long time to be filtrated. The evaluation results of the refractive index, the Abbe number, the heat resistance and the tonality of the obtained optical material are shown in Table 1. The refractive index was raised but the tonality was significantly deteriorated.

TABLE 1

| | Composition: parts by weight | | | | Viscosity 0 h/2 h (mPa·s) | Refractive index ($n_e$) | Abbe number ($v_d$) | Heat resistance (softening point) (°C.) | Tonality (YI value) |
|---|---|---|---|---|---|---|---|---|---|
| | (a) compound | (b) compound | (c) compound | Other compound | | | | | |
| Ex. 1 | a-1: 29 | b-1: 71 | c-1: 15 | | 100/140 | 1.776 | 30 | >120 | 8.6 |
| Ex. 2 | a-1: 29 | b-1: 71 | c-1: 20 | | 90/140 | 1.776 | 30 | 75 | 5.5 |
| Comparative ex. 1 | a-1: 29 | b-1: 71 | | | Gelated/— | Gelated and no cured substance was obtained. | | | |
| Comparative ex. 2 | a-1: 29 | b-1: 71 | | o-1: 10 | Gelated/— | Gelated and no cured substance was obtained. | | | |
| Comparative ex. 3 | a-1: 29 | b-1: 71 | | o-2: 10 | 220/300 | 1.760 | 28 | 61 | 22 |
| Comparative ex. 4 | a-1: 29 | b-1: 71 | | o-3: 10 | 200/250 | 1.762 | 28 | 72 | 25 |
| Comparative ex. 5 | a-1: 35 | b-1: 65 | | o-2: 10 | 380/1500 | 1.772 | 27 | 65 | 38 |
| Comparative ex. 6 | a-1: 35 | b-1: 65 | | o-3: 10 | 350/1200 | 1.774 | 27 | 75 | 45 |

Examples 3 to 14

Compositions for a resin were prepared in the same manner as in Example 1 except that the a-1 compound, the b-1 compound and the c-1 compound were changed to the compounds shown in Table 2 below and that the amount of each compound was changed to the amount shown in Table 2 below. The viscosity of each composition for a resin after the degassing and 2 hours later, and the refractive index, the Abbe number, the heat resistance and the tonality of each obtained optical material were evaluated in the same manner as in Example 1.

TABLE 2

| | Composition: parts by weight | | | |
|---|---|---|---|---|
| | (a) compound | (b) compound | (c) compound | Other compound |
| Ex. 3 | Sulfur (a-1): 29 | Bis(β-epithiopropyl)sulfide (b-1): 71 | Bis(dimercaptomethyl)disulfide (c-2): 15 | |
| Ex. 4 | Sulfur (a-1): 29 | Bis(β-epithiopropyl)sulfide (b-1): 71 | Bis(dimercaptomethyl)disulfide (c-2): 20 | |
| Ex. 5 | Sulfur (a-1): 19 | Bis(β-epithiopropyl)disulfide (b-2): 81 | Bis(mercaptomethyl)disulfide (c-1): 15 | |
| Ex. 6 | Sulfur (a-1): 19 | Bis(β-epithiopropyl)disulfide (b-2): 81 | Bis(mercaptomethyl)disulfide (c-1): 20 | |
| Ex. 7 | Sulfur (a-1): 19 | Bis(β-epithiopropyl)disulfide (b-2): 81 | Bis(dimercaptomethyl)disulfide (c-2): 15 | |
| Ex. 8 | Sulfur (a-1): 19 | Bis(β-epithiopropyl)disulfide (b-2): 81 | Bis(dimercaptomethyl)disulfide (c-2): 20 | |
| Ex. 9 | Sulfur (a-1): 29 | Bis(β-epithiopropylthio)ethane (b-3): 71 | Bis(mercaptomethyl)disulfide (c-1): 15 | |
| Ex. 10 | Sulfur (a-1): 29 | Bis(β-epithiopropylthio)ethane (b-3): 71 | Bis(mercaptomethyl)disulfide (c-1): 20 | |
| Ex. 11 | Selenium sulfide (a-2): 15 | Bis(β-epithiopropyl)sulfide (b-1): 85 | Bis(mercaptomethyl)disulfide (c-1): 15 | |
| Ex. 12 | Selenium sulfide (a-2): 15 | Bis(β-epithiopropyl)sulfide (b-1): 85 | Bis(mercaptomethyl)disulfide (c-1): 20 | |
| Ex. 13 | Sulfur (a-1): 29 | Bis(β-epithiopropyl)sulfide (b-1): 71 | Bis(mercaptomethyl)disulfide (c-1): 15 | Bis(2-mercaptoethyl)sulfide (o-1): 5 |
| Ex. 14 | Sulfur (a-1): 29 | Bis(β-epithiopropyl)sulfide (b-1): 71 | Bis(mercaptomethyl)disulfide (c-1): 20 | Bis(2-mercaptoethyl)sulfide (o-1): 5 |

According to the present invention, the viscosity of a composition for a resin containing an inorganic compound having a sulfur atom and/or a selenium atom can be decreased. Therefore, the cast polymerization operation including filtration is facilitated, and also the tonality of the obtained optical material is improved.

INDUSTRIAL APPLICABILITY

The present invention relates to a composition for a resin and an optical material obtained therefrom. The optical material obtained according to the present invention is usable for optical products such as plastic lenses, prisms, optical fibers, information recording substrates, filters, adhesives and the like, especially preferably for plastic lenses for eyeglasses.

The invention claimed is:

1. A method for producing a composition for a resin, comprising:
    mixing an (a) inorganic compound having a sulfur atom and/or a selenium atom and a (b) compound represented by the following formula (1):

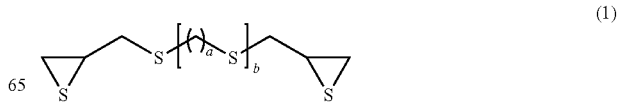

(1)

(a represents an integer of 0 to 4, and b represents an integer of 0 to 2); and performing a preliminary polymerization reaction of the obtained mixture for 1 minute to 72 hours at 0° C. to 150° C.; and mixing the preliminarily polymerized mixture and a (c) compound represented by the following formula (2):

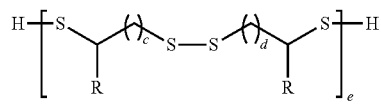

(2)

(c represents 0 or 1, d represents 0 or 1, e represents an integer of 1 to 10, and R represents H, SH, CH$_2$SH or an aromatic ring), wherein the (a) compound is contained in an amount of 1 to 50 parts by weight when the (a) compound and the (b) compound have a total amount of 100 parts by weight, the (b) compound is contained in an amount of 50 to 99 parts by weight when the (a) compound and the (b) compound have a total amount of 100 parts by weight, and the (c) compound is contained in an amount of 1 to 50 parts by weight when the (a) compound and the (b) compound have a total amount of 100 parts by weight.

2. A method for producing a composition for a resin, comprising:

mixing an (a) inorganic compound having a sulfur atom and/or a selenium atom, a (b) compound represented by the following formula (1):

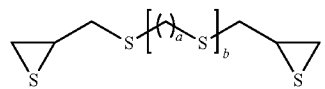

(1)

(a represents an integer of 0 to 4, and b represents an integer of 0 to 2), and a (c) compound represented by the following formula (2);

performing a preliminary polymerization reaction of the obtained mixture for 1 minute to 72 hours at 0° C. to 150° C.; and further mixing the preliminarily polymerized mixture and the (c) compound represented by the following formula (2):

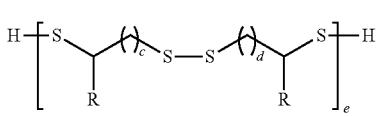

(2)

(c represents 0 or 1, d represents 0 or 1, e represents an integer of 1 to 10, and R represents H, SH, CH$_2$SH or an aromatic ring);

wherein the (a) compound is contained in an amount of 1 to 50 parts by weight when the (a) compound and the (b) compound have a total amount of 100 parts by weight, the (b) compound is contained in an amount of 50 to 99 parts by weight when the (a) compound and the (b) compound have a total amount of 100 parts by weight, and the (c) compound is contained in an amount of 1 to 50 parts by weight when the (a) compound and the (b) compound have a total amount of 100 parts by weight.

3. The method for producing a composition for a resin according to claim 1, further comprising performing degassing under reduced pressure of 0.005 to 250 torr for 1 minute to 24 hours at 0° C. to 100° C.

4. A method for producing an optical material, comprising polymerizing and curing the composition for a resin obtained by the method for producing a composition for a resin according to claim 1.

5. The method for producing a composition for a resin according to claim 1, wherein the compound having a sulfur atom and/or a selenium atom is sulfur or selenium sulfide.

6. The method for producing a composition for a resin according to claim 2, wherein the compound having a sulfur atom and/or a selenium atom is sulfur or selenium sulfide.

7. The method for producing a composition for a resin according to claim 1, wherein the (b) compound is bis(β-epithiopropyl)sulfide or bis(β-epithiopropyl)disulfide, and the (c) compound is bis(mercaptomethyl)disulfide.

8. The method for producing a composition for a resin according to claim 2, wherein the (b) compound is bis(β-epithiopropyl)sulfide or bis(β-epithiopropyl)disulfide, and the (c) compound is bis(mercaptomethyl)disulfide.

\* \* \* \* \*